United States Patent
Cook et al.

(10) Patent No.: US 11,927,263 B2
(45) Date of Patent: Mar. 12, 2024

(54) METHODS AND SYSTEMS FOR A TRANSMISSION SHIFT ASSEMBLY

(71) Applicant: Dana Heavy Vehicle Systems Group, LLC, Maumee, OH (US)

(72) Inventors: Michael D. Cook, Holland, OH (US); Mark A. Davis, Opelika, AL (US); Jordan M. Houser, Sylvania, OH (US); Travis J. Miller, Austin, TX (US); George A. Willford, Waterville, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 17/935,479

(22) Filed: Sep. 26, 2022

(65) Prior Publication Data

US 2023/0016244 A1    Jan. 19, 2023

Related U.S. Application Data

(60) Division of application No. 17/081,797, filed on Oct. 27, 2020, now Pat. No. 11,530,747, which is a continuation of application No. 16/983,896, filed on Aug. 3, 2020, now Pat. No. 11,692,626.

(51) Int. Cl.
*F16H 63/18* (2006.01)
*F16H 63/30* (2006.01)
*F16H 63/32* (2006.01)

(52) U.S. Cl.
CPC .......... *F16H 63/18* (2013.01); *F16H 63/304* (2013.01); *F16H 63/32* (2013.01); *F16H 2063/3056* (2013.01); *F16H 2063/321* (2013.01)

(58) Field of Classification Search
CPC ........ F16H 63/18; F16H 63/304; F16H 63/32; F16H 2063/3056; F16H 2063/321; F16H 61/0059; F16H 61/0213; F16H 61/32; F16H 3/089; F16H 59/18; F16H 59/44; F16H 59/70; F16H 59/72; F16H 2059/366; F16H 2061/0087; F16H 2200/0021; F16H 2200/0039; F16H 63/24; F16H 63/30; B60Y 2200/91
See application file for complete search history.

(56) References Cited

U.S. PATENT DOCUMENTS

| | | |
|---|---|---|
| 6,869,382 B2 | 3/2005 | Leising et al. |
| 7,363,834 B2 | 4/2008 | Kapp et al. |
| 7,428,852 B2 | 9/2008 | Baldwin et al. |
| 7,467,564 B2 | 12/2008 | Baldwin et al. |
| 7,661,331 B2 | 2/2010 | Ogami et al. |
| 8,402,859 B2 | 3/2013 | Neelakantan et al. |
| 8,433,489 B2 | 4/2013 | Arai |
| 8,578,803 B2 | 11/2013 | Neelakantan et al. |
| 8,635,927 B2 | 1/2014 | Akashi et al. |
| 8,844,392 B2 | 9/2014 | Neelakantan et al. |

(Continued)

*Primary Examiner* — Victor L Macarthur
(74) *Attorney, Agent, or Firm* — McCoy Russell LLP

(57) ABSTRACT

Various methods and systems are provided for a shift assembly for a vehicle transmission. In one example, a shift assembly for a transmission includes a first barrel cam including a first cam track; a second barrel cam arranged coaxially with the first barrel cam and including a second cam track; a first motor configured to drive the first barrel cam independent of the second barrel cam; and a second motor configured to drive the second barrel cam independent of the first barrel cam.

7 Claims, 8 Drawing Sheets

(56) References Cited

U.S. PATENT DOCUMENTS

| | | |
|---|---|---|
| 8,967,008 B2 | 3/2015 | Olson et al. |
| 9,016,154 B2 | 4/2015 | Pregnolato et al. |
| 10,113,641 B2 | 10/2018 | Kang et al. |
| 2003/0019312 A1 | 1/2003 | Gumpoltsberger et al. |
| 2012/0298466 A1 | 11/2012 | Nedachi et al. |
| 2013/0319142 A1 | 12/2013 | Kim |
| 2017/0146122 A1 | 5/2017 | Kang et al. |
| 2018/0119749 A1 | 5/2018 | Takeuchi |
| 2018/0135751 A1 | 5/2018 | Maki |

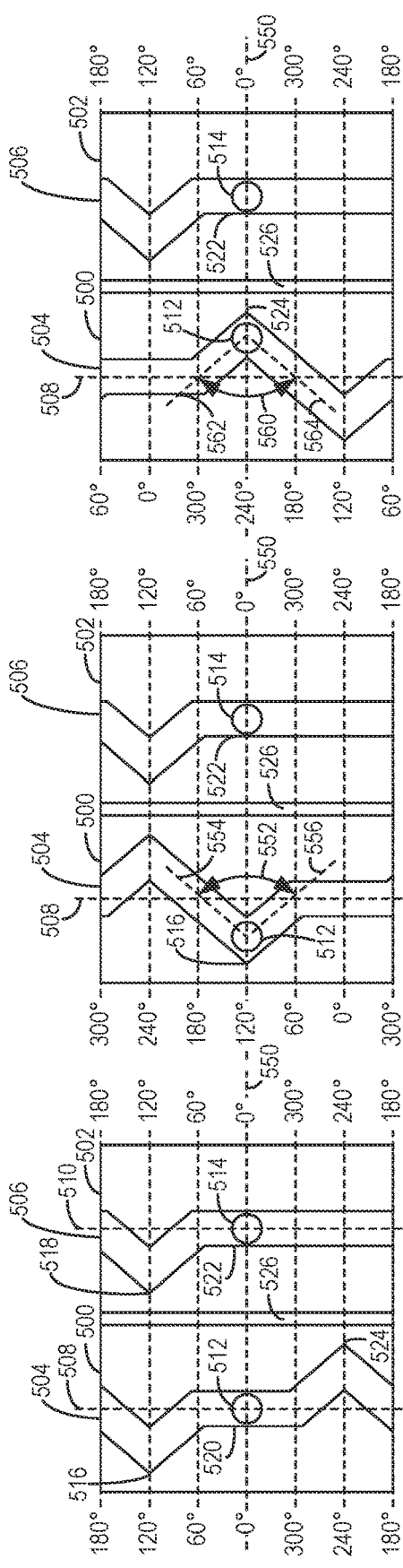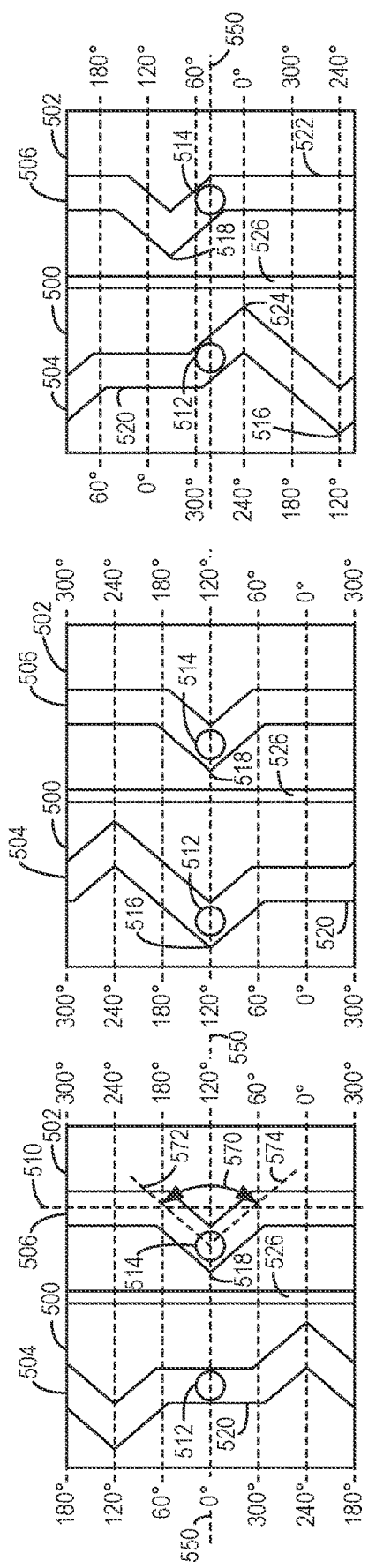

METHODS AND SYSTEMS FOR A TRANSMISSION SHIFT ASSEMBLY

CROSS-REFERENCE TO RELATED APPLICATION

The present application is a divisional of U.S. Non-Provisional patent application Ser. No. 17/081,797, entitled "METHODS AND SYSTEMS FOR A TRANSMISSION SHIFT ASSEMBLY", and filed Oct. 27, 2020. U.S. Non-Provisional patent application Ser. No. 17/081,797 is a continuation of U.S. Non-Provisional patent application Ser. No. 16/983,896, entitled "METHODS AND SYSTEMS FOR A TRANSMISSION SHIFT ASSEMBLY", and filed on Aug. 3, 2020. The entire contents of the above-listed application are hereby incorporated by reference for all purposes.

TECHNICAL FIELD

Embodiments of the subject matter disclosed herein relate generally to methods and systems for a shift assembly for a vehicle transmission.

BACKGROUND

Some vehicle transmissions include a shift mechanism configured to transition the transmission through a predetermined gear engagement sequence. Each gear engagement of the sequence results in a particular gear ratio of the transmission, and the shift mechanism transitions the transmission to each gear ratio in an ascending or descending order. The ascending order may include shifting from first gear, then to second gear, then to third gear, and so forth, with the descending order being the reverse of the ascending order. The shift mechanism often includes a barrel cam to coordinate the shifting of the gears, where rotation of the barrel cam synchronizes movement of shift forks and synchronizer rings to disengage the currently selected gear and engage the next gear of the sequence in the ascending or descending order.

However, the inventors herein have recognized potential issues with such systems. As one example, degradation of the barrel cam and/or variation in vehicle operating conditions may result in undesired shift behavior, such as slower gear engagement and/or disengagement. Additionally, particular transitions of the gear engagement sequence occurring with higher frequency during operation of the vehicle, such as the transition between first gear and second gear, may result in different wear characteristics of the barrel cam relative to other transitions, which may further increase undesired shift behavior.

SUMMARY

In one example, the issues described above may be addressed by a shift assembly for a transmission comprising: a first barrel cam including a first cam track; a second barrel cam arranged coaxially with the first barrel cam and including a second cam track; a first motor configured to drive the first barrel cam independent of the second barrel cam; and a second motor configured to drive the second barrel cam independent of the first barrel cam. In this way, the first barrel cam and second barrel cam may be driven to rotate independently of each other to adjust the gear engagement of the transmission.

As one example, the first barrel cam and second barrel cam are rotatably coupled independent of each other by a bushing. The first barrel cam and the second barrel cam are supported by a first bearing and a second bearing along a same rotational axis. The first motor and the second motor are controlled by an electronic controller. The first barrel cam may be driven in order to control engagement of a first plurality of gears of the transmission, and the second barrel cam may be driven in order to control at least one different gear of the transmission. As a result, the barrel cams may be driven independently to provide tuning of the performance of the shift assembly for different gear engagements and/or for different vehicle operating conditions such as oil type, temperature, driving habits, desired shift feel, etc.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below:

FIGS. 5A-5F show a first barrel and a second barrel of the shift assembly of FIG. 2 in different rotational positions.

DETAILED DESCRIPTION

Figure 6:
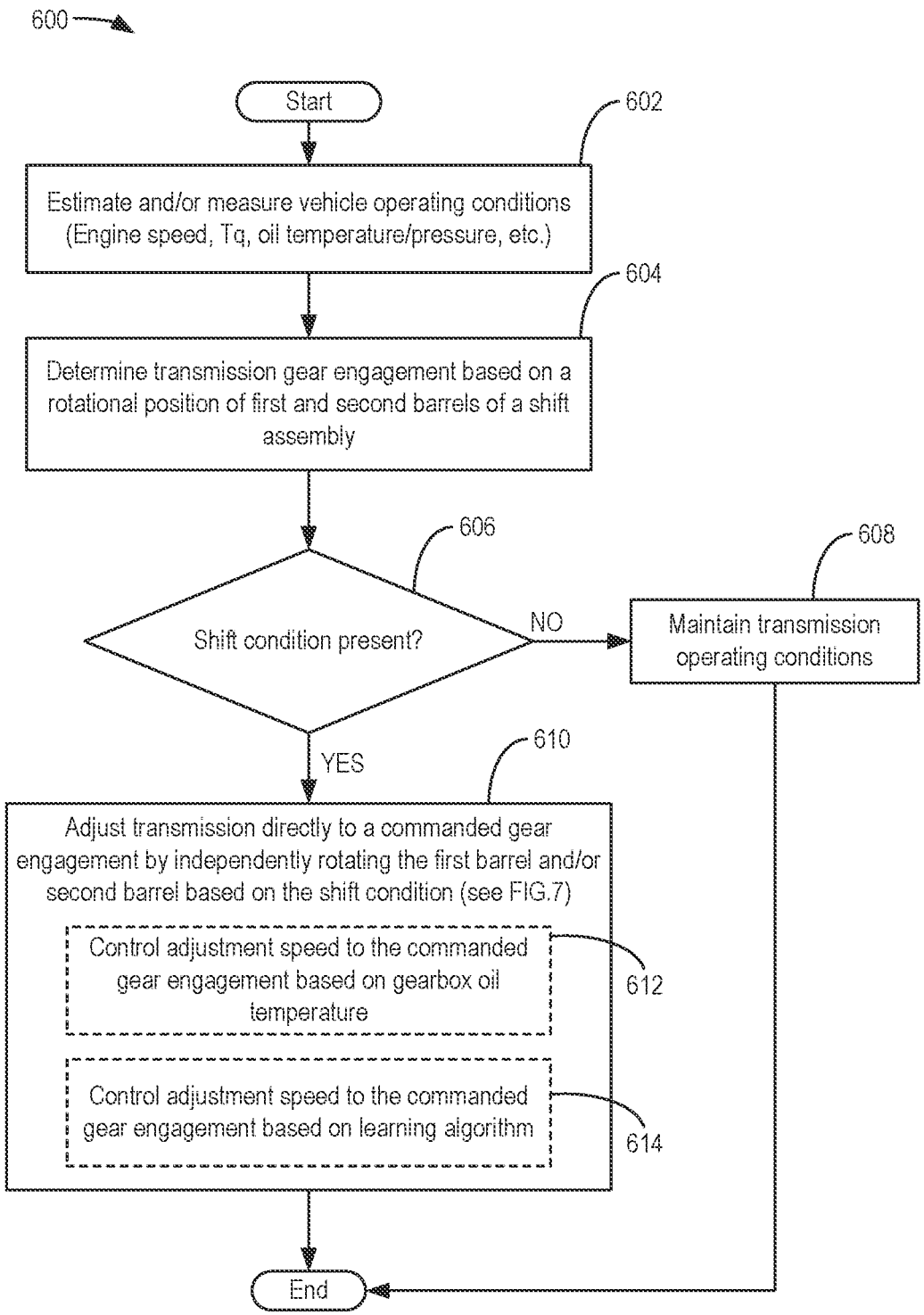
FIG. 6 shows a flowchart depicting an example method for controlling gear engagement of a transmission via a shift assembly including a first barrel and a second barrel driven by different motors.
Figure 7:
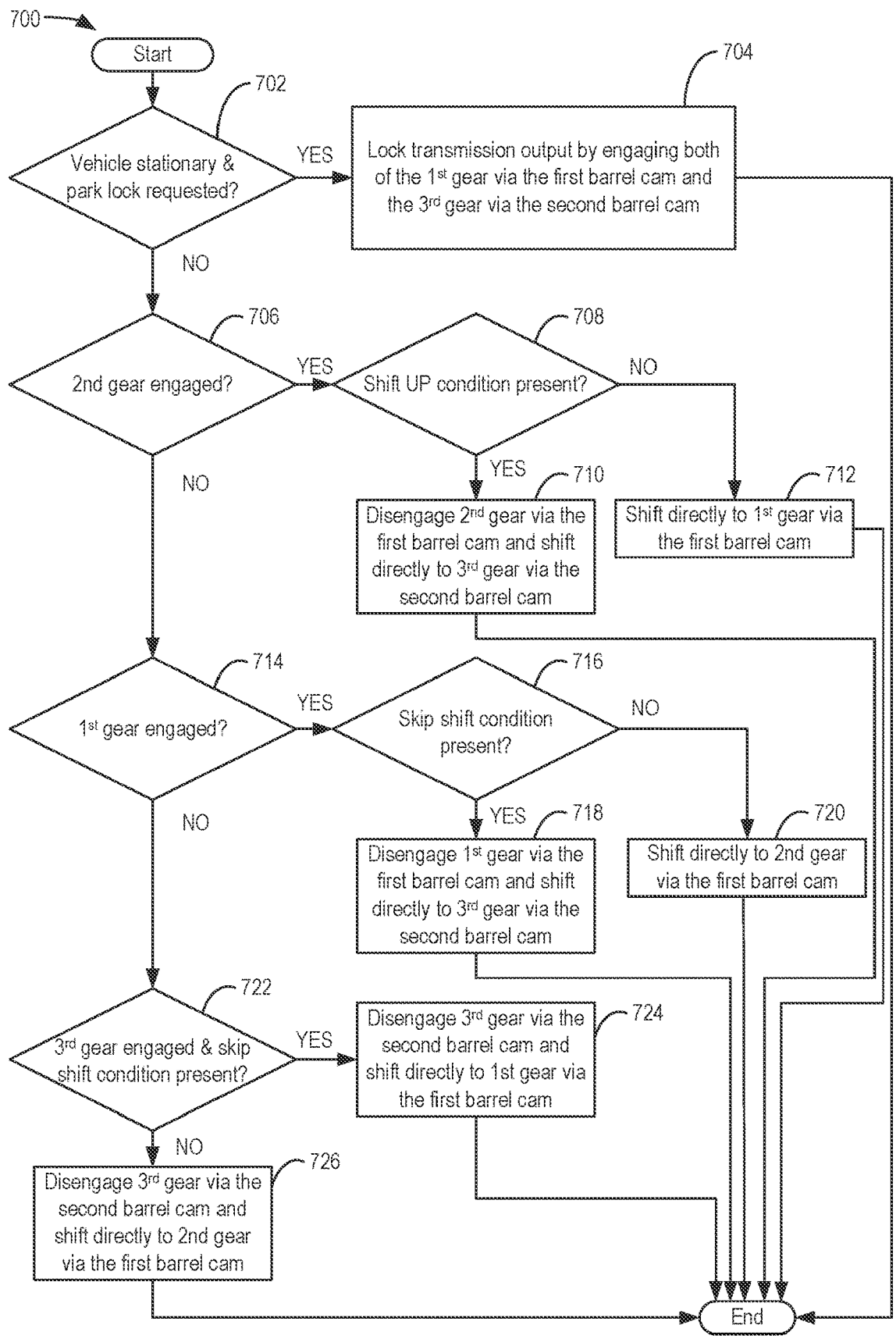
FIG. 7 shows a flowchart depicting a continuation of the method of FIG. 6 during conditions in which a shift condition is present.
Figure 8:
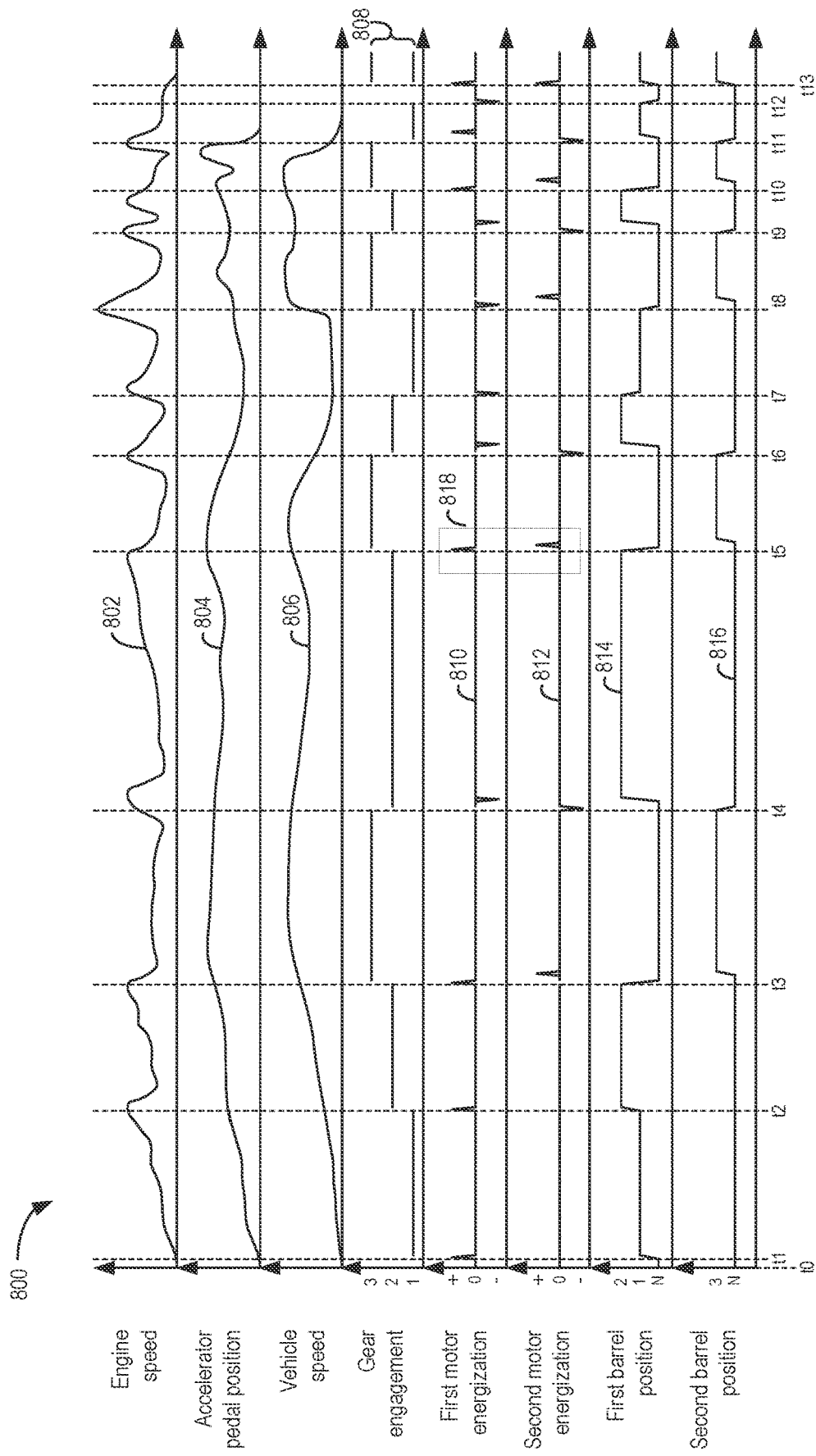
FIG. 8 shows a graph including plots illustrating various operating parameters of a vehicle including a shift assembly having a first barrel and a second barrel driven by different motors.
Figure 9:
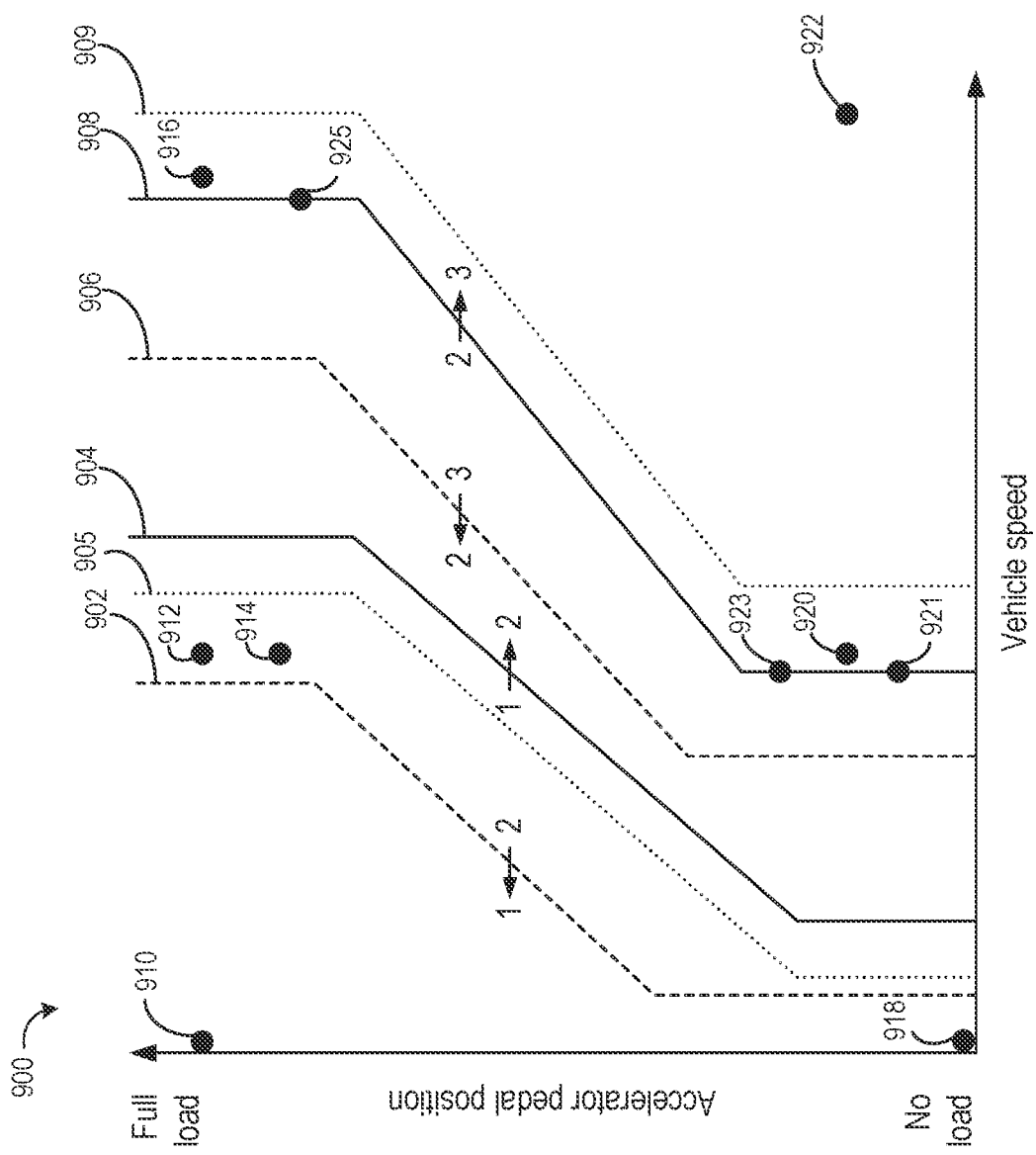
FIG. 9 shows a graph including plots illustrating shift thresholds of a transmission controlled via a shift assembly including a first barrel and a second barrel driven by different motors.

The following disclosure relates to methods and systems for a shift assembly of a vehicle transmission. A vehicle, such as the vehicle shown by FIG. 1, includes a transmission and a shift assembly, such as the shift assembly shown by FIG. 2. The shift assembly includes a split barrel mechanism, where a first barrel cam and a second barrel cam of the split barrel mechanism are arranged coaxially along a common rotational axis and are spaced apart by a bushing. Each barrel cam may rotate independently, and a controller adjusts rotation of the barrel cams in order to adjust the gear engagement of the transmission. The rotation of each barrel cam is controlled independently via respective independently operated actuator systems, such as the actuator system shown by FIG. 3. Rotation of the barrel cams may occur responsive to a shift condition, as illustrated by the flowcharts of FIGS. 6-7, with the shift condition based on vehicle operating conditions, as illustrated by the graphs of FIGS. 8-9. In some examples, the controller may concurrently rotate both of the first barrel cam and second barrel cam, and in some examples the controller may rotate only one of the first barrel cam or second barrel cam. The rotation of the barrel cams adjusts the corresponding shift forks to various different positions, such as the positions shown by FIGS. 5A-5F. The shift forks slide along a shift rod parallel to the transmission input shaft to engage or disengage the gears of the transmission, such as the transmission shown in FIG. 4. In this way, the barrel cams of the shift assembly may increase a shift performance of the transmission, and the controller may adjust each barrel cam independently based on vehicle operating conditions in order to increase shift responsiveness and/or control engagement of the gears in a non-sequential order.

Figure 1:
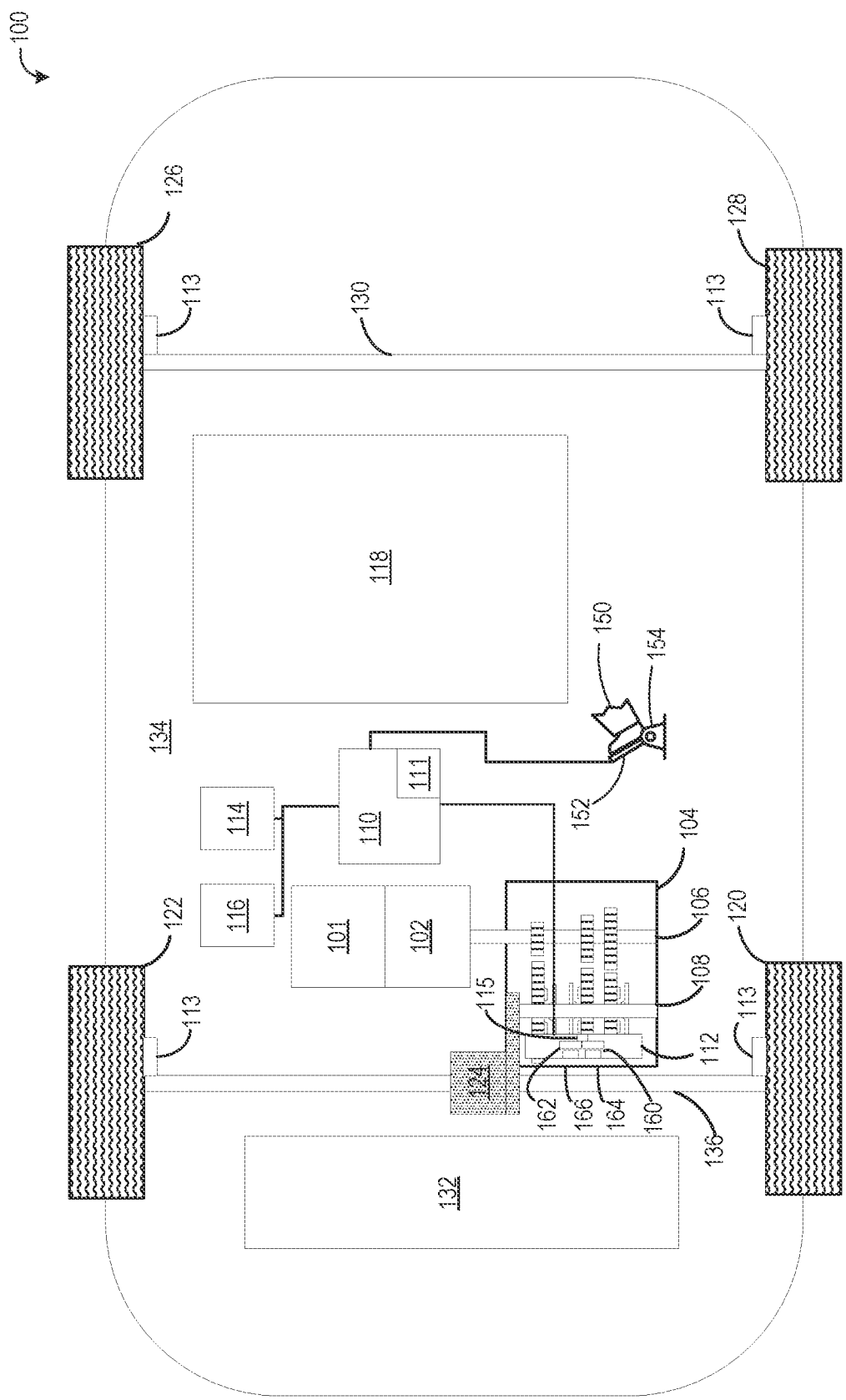
FIG. 1 schematically shows a vehicle including a transmission and a shift assembly.

Referring now to FIG. 1, an example vehicle 100 is shown. In some examples, vehicle 100 may be a hybrid vehicle configured to provide torque to one or more wheels from multiple sources, such as engine 101 and electric motor 102. In other examples, vehicle 100 is configured to provide torque to the one or more wheels via only one of engine 101 or electric motor 102. In the example in which vehicle 100 is a hybrid vehicle, operation of the vehicle 100 may be adjusted between various different modes in which torque is supplied to the one or more wheels via only the engine 101, via only the electric motor 102, or via a combination of the engine 101 and electric motor 102. Electric motor 102 may be a motor/generator configured to provide torque output to the one or more wheels and to generate electrical energy during operation of the vehicle 100 (e.g., via regenerative braking, as one example). Vehicle 100 is provided as an example of a system including a shift assembly as described herein. However, vehicle 100 is not intended to be limiting and in some examples the shift assembly may be included in vehicles having a different configuration (e.g., a different number and/or relative configuration of wheels and/or other components).

The vehicle 100 may be powered by electric motor 102 and/or engine 101, which generates torque in a drive wheel 120 when one or more clutches are engaged via a transmission 104 connected to a transmission input shaft 106 and an output shaft 108. In FIG. 1, the output shaft 108 is a countershaft that rotatably coupled to an input of a differential gear assembly 124, which may power one or more of a first drive wheel 120 and a second drive wheel 122 via drive axle 136. In other embodiments, the output shaft 108 may be coaxially aligned with the transmission input shaft 106, and a countershaft may be used to provide torque applied to the input shaft 106 to the output shaft 108 via a gear assembly of the transmission. In still other embodiments, engine 101 and/or electric motor 102, transmission 104, input shaft 106, and output shaft 108 may be aligned perpendicular to the axles of vehicle 100, whereby the transfer of torque from the output shaft to a drive wheel or drive axle is accomplished via the differential gear assembly 124 mounted on the drive axle 136.

In some examples, the torque may be applied to only one drive wheel, or the torque applied to the first drive wheel 120 and the second drive wheel 122 by the differential gear assembly 124 may be different (for example, during cornering of the vehicle or operation on an uneven ground surface), and in some conditions it may be approximately the same (for example, while driving the vehicle straight on a level ground surface, without cornering). The vehicle 100 may also include one or more free wheels, such as free wheels 126 and 128 mounted on free axle 130. The free wheels may rotate as the vehicle is driven without being directly propelled by the engine or electric motor (e.g., the engine and electric motor do not apply torque directly to the axle coupled to the free wheels). In other embodiments, additional free wheels may be included on free axle 130, and/or additional free axles may be included in vehicle 100, each of which may include a plurality of wheels. For example, heavy trucks or buses may have additional front and/or rear axles to distribute the weight of cargo, and each axle may include two wheels on each side. Still other embodiments may include a single free wheel, for example, in a motorcycle.

As shown in the illustrated example, the first drive wheel and the second drive wheel may be front wheels. In other embodiments, the first drive wheel and the second drive wheel may be rear wheels, and the front wheels may be free wheels, or a transfer case (not depicted in FIG. 1) may be used to power all the wheels on vehicle 100, for example, in the case of 4-wheel drive vehicles or all-wheel-drive vehicles. The position or number of drive wheels on vehicle 100 should not be construed as limiting the scope of this disclosure.

Each of the wheels of the vehicle (e.g., wheel 120, wheel 122, wheel 126, and wheel 128) may include a respective wheel speed sensor (which may be referred to herein as a vehicle speed sensor), such as wheel speed sensors 113. The controller 110 may receive signals (e.g., electronic signals) from the wheel speed sensors 113 and may determine a speed of the vehicle based on the signals received from the wheel speed sensors 113.

In an embodiment, the transmission 104 may be an automated manual transmission, whereby shifting is handled automatically by an electronic controller 110. Further, the transmission may be adjustable between various modes of operation. For example, an operator of the vehicle (e.g., a driver) may adjust the transmission between a manual mode in which gear selection is performed by the operator via an input device (e.g., a shift lever) and an automated mode in which the gear selection is automatically determined by the controller based on vehicle operating conditions (e.g., engine speed, vehicle speed, wheel torque, etc.). The transmission 104 is described in further detail below in reference to FIGS. 2-4.

For automatic shifting, the electronic controller 110 may be communicatively coupled to a shift assembly 112 that engages gears of the transmission 104 via a first barrel cam 160 and/or a second barrel cam 162. For example, the electronic controller 110 may command the first barrel cam 160 and/or the second barrel cam 162 to various rotational positions in order to engage and/or disengage gears of the transmission, similar to the examples described below with reference to FIGS. 2-9. The shift assembly 112 may include actuator sensors from which the electronic controller 110 may receive data used to control operation of the shift assembly (e.g., to adjust a selected gear of the transmission). The electronic controller 110 may also receive input from other sensors of vehicle 100, such as wheel sensors, pedal position sensors, temperature sensors, pressure sensors, speed sensors, throttle sensors, battery charge sensors, air-fuel ratio sensors, etc. The electronic controller 110 may send control signals to various actuators communicatively coupled to electric motor 102, engine 101, and/or other components of vehicle 100. The various actuators may include motors of the shift assembly 112 that engage the gears of transmission 104 by sliding synchronizer rings and cone clutches along the transmission output shaft 108, via shift forks that slide along a selector shaft (not depicted in FIG. 1). The various actuators may also include, for example, various valves, throttles, fuel injectors, etc. The types of sensors and actuators listed herein are for illustrative purposes and any type of sensors and/or actuators may be included without departing from the scope of this disclosure.

The shift assembly 112 may include an oil temperature sensor, such as the oil temperature sensor 115 shown schematically by FIG. 1. The controller 110 may measure a temperature of oil within the transmission 104 via signals (e.g., electronic signals) received by the controller 110 via the oil temperature sensor 115 (e.g., the oil temperature sensor 115 may be electrically coupled with the controller 110 and in electronic communication with the controller 110). In some examples, the oil temperature sensor 115 may be arranged within a gearbox portion of the transmission 104 (e.g., a portion of the transmission 104 configured to house the gears of the transmission 104). For example, the oil temperature sensor 115 may be arranged proximate to the first barrel cam 160, second barrel cam 162, one or more shift forks of the transmission, etc.

Electronic controller 110 may be a microcomputer, which may include a microprocessor unit, input/output ports, and an electronic storage medium for executable programs and calibration values. Electronic controller 110 may include non-transitory computer readable medium (memory) in which programming instructions are stored, and may be programmed with computer readable data representing instructions executable to perform the methods described below, as well as other variants that are anticipated but not specifically listed. Memory as referenced herein may include volatile and non-volatile or removable and non-removable media for a storage of electronic-formatted information such as computer readable instructions or modules of computer readable instructions, data, etc. Examples of computer memory may include, but are not limited to RAM, ROM, EEPROM, flash memory, or any other medium which can be used to store the desired electronic format of information and which can be accessed by the processor or processors or at least a portion of a computing device. The electronic controller 110 may be electrically coupled to a battery 114 and a starter 116, which may be used to provide initial power to the controller and/or start the engine. The vehicle and engine may be controlled at least partially by the controller 110 and by input from a vehicle operator 150 via an input device 152. In this example, input device 152 includes an accelerator pedal and a pedal position sensor 154 for generating a proportional pedal position signal.

In the example shown, the electronic controller 110 includes a learning module 111. Learning module 111 may be integrated with the memory of the electronic controller 110. For example, learning module 111 may comprise one or more learning algorithms stored in the memory of the controller, such as one or more machine learning algorithms and/or deep neural networks. The learning module 111 may adjust operation of the shift assembly 112 based on vehicle operation data stored within the memory of the controller 110. As one example, the controller may measure and store data acquired from various sensors of the vehicle (e.g., pedal position sensor 154, oil temperature sensor 115, wheel speed sensors 113, etc.) through several cycles of vehicle operation (e.g., several ON/OFF cycles of the engine, with each cycle spanning from an engine key-on event to an engine key-off event). The controller 110 may adjust operating parameters of the vehicle based on the acquired data via the learning module 111. Adjusting the operating parameters may include adjusting a rotation speed and/or rotation timing of the first barrel cam 160 and/or second barrel cam 162 (e.g., advancing and/or retarding a rotation of the barrel cams, increasing and/or decreasing the rotation speed of the barrel cams, etc.), a shift timing of the transmission (e.g., via control of the first barrel cam 160 and/or the second barrel cam 162), an amount of energization (e.g., duty cycle) and/or an energization polarity (e.g., change in voltage) of a first motor 164 configured to drive the first barrel cam 160 and/or a second motor 166 configured to drive the second barrel cam 162, etc.

As one example, the controller may adjust a relative rotation timing of the first barrel cam 160 and second barrel cam 162 (e.g., a rotation timing of the first barrel cam 160 relative to the second barrel cam 162, or vice versa) based on a predicted response rate of the first barrel cam 160 and/or second barrel cam 162, where the predicted response rate is determined via the learning module 111 based on the data acquired through the several cycles of vehicle operation. For a given barrel cam (e.g., the first barrel cam 160 or the second barrel cam 162), the predicted response rate of the given barrel cam may be a duration, as estimated by the controller 110 via the learning module 111 based on the data acquired through the several cycles of vehicle operation, from an initiation of a commanded rotation of the given barrel cam to a completion of the commanded rotation of the given barrel cam, where the completion of the commanded rotation immediately follows the initiation of the commanded rotation (e.g., with no other commanded rotations therebetween). The predicted response rate may be estimated by the controller based on the acquired data and/or as a function of one or more vehicle operating parameters, such as transmission oil temperature and/or the amount of energization of the motor configured to drive the given barrel cam (e.g., the first motor 164 configured to drive the first barrel cam 160 or the second motor 166 configured to drive the second barrel cam).

The electric motor 102 may be powered by a battery pack 118. Battery pack 118 may be an energy storage device configured to deliver electrical power to various components of the electrical system of the vehicle 100 including supplying current to electric motor 102 coupled to front wheels 120 and 122 and/or other powered wheels of the vehicle 100. The battery pack 118 may be electrically coupled with the electric motor 102 and/or the electronic controller 110. The electronic controller 110 may regulate the power supply provided by the battery pack 118 to the electric motor 102 in order to increase or decrease the speed of the vehicle 100.

Engine 101 may be powered by fuel such as gasoline, diesel fuel, natural gas, biofuels, or any other combustible fuel; and accordingly, the vehicle 100 may include a fuel tank connected to the engine 101 via a fuel pump and intake system. The engine 101 and/or electric motor 102 may be positioned on a chassis 134 in a variety of configurations. For example, engine 101 and electric motor 102 may be positioned proximate to each other, or engine 101 and electric motor may be positioned further apart from each other along the chassis 134.

Transmission 104, electric motor 102, and/or engine 101 may be cooled by a cooling system 132 (e.g., a radiator, fan, etc.) positioned on the chassis 134 proximate electric motor 102, transmission 104, and/or engine 101.

Figures 2, 3:
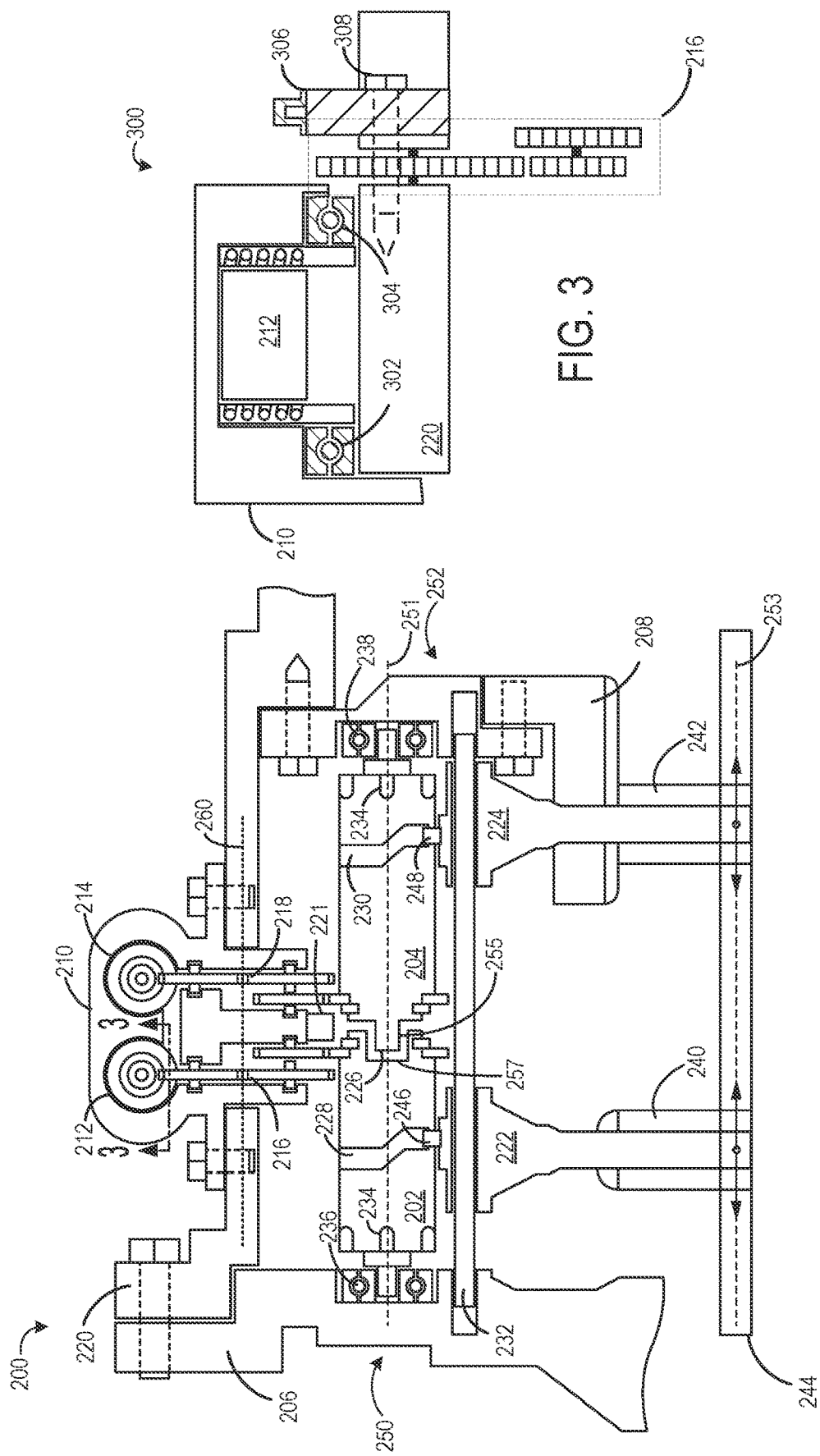
FIG. 2 shows a shift assembly for a transmission.
FIG. 3 shows an enlarged view of a motor of the shift assembly of FIG. 2.

Referring now to FIG. 2, shift assembly 200 shows an example gear actuator system featuring a split-barrel cam actuator. Shift assembly 200 may be the same as or similar to shift assembly 112 of vehicle 100 of FIG. 1. In an embodiment, a first barrel cam 202 and a second barrel cam 204 are coaxially aligned between a front motor plate 206 at a first side 250 and a clutch grounding plate assembly 208 at an opposing, second side 252.

The first barrel cam 202 and second barrel cam 204 may be secured via bearings 236 and 238, respectively, and coupled together by a bushing 226 (e.g., thrust surface) positioned between the bearings 236 and 238, such that the first barrel cam 202 and the second barrel cam 204 may rotate independently with respect to each other. Bushing 226 may include a protrusion 255 of the second barrel cam 204 shaped to seat within a recess 257 of the first barrel cam 202. The second barrel cam 204 may rotate independently of the first barrel cam 202, and as the second barrel cam 204 rotates, the protrusion 255 of the second barrel cam 204 may rotate within the recess 257 of the first barrel cam 202. The first barrel cam 202 and second barrel cam 204 may each rotate bidirectionally along rotational axis 251. For example, first barrel cam 202 may rotate a clockwise direction around the rotational axis 251 while second barrel cam 204 rotates in a counterclockwise direction around the rotational axis 251, or first barrel cam 202 may rotate in a counterclockwise direction while second barrel cam 204 rotates in a clockwise direction, or both barrel cams may rotate in the same direction, either clockwise or counterclockwise. A controller (e.g., similar to the electronic controller 110 shown by FIG. 1 and described above) in electronic communication with an actuator of the first barrel cam 202 and an actuator of the second barrel cam 204 may command the first barrel cam 202 to rotate in the clockwise or counterclockwise direction. Although the first barrel cam 202 and second barrel cam 204 are arranged along the same rotational axis, the controller may command the second barrel cam 204 to rotate in the clockwise or counterclockwise direction, independently from the rotation of the first barrel cam 202. For example, the controller may command only the first barrel cam 202 to rotate, the controller may command only the second barrel cam 204 to rotate, or the controller may rotate the first barrel cam 202 and second barrel cam 204 concurrently.

The outer perimeter of the first barrel cam 202 and the outer perimeter of the second barrel cam 204 includes a plurality of detent grooves 234. The detent grooves 234 on the first barrel cam 202 (not depicted in FIG. 2) and the second barrel cam 204 provide for the first barrel cam 202 and the second barrel cam 204 to rotate in discrete angular increments to ensure precision in the rotation. As one example, each detent groove formed in the first barrel cam 202 and the second barrel cam 204 may be spaced apart from each adjacent detent groove by 5° around the outer perimeter of the second barrel cam 204, such that the second barrel cam includes 72 detent grooves (e.g., spanning 360° of the outer perimeter), whereby the detent grooves provide for the first barrel cam 202 and the second barrel cam 204 to rotate in increments of 5° (e.g., 30°, 35°, 40°, etc.). In other embodiments, the detent grooves of the first barrel cam 202 and second barrel cam 204 may be in a different arrangement. For example, each detent groove formed in the first barrel cam 202 and/or the second barrel cam 204 may be arranged in a rotational position of the first barrel cam 202 and/or the second barrel cam 204 that corresponds to the engagement of a gear of the transmission. Thus, clear and discrete rotational positions of the first barrel cam 202 and the second barrel cam 204 may be communicated to a drive controller such as electronic controller 110 of vehicle 100 of FIG. 1, as described in further detail below with respect to FIG. 3.

The first barrel cam 202 and the second barrel cam 204 are shown coupled to an actuator motor assembly 210 that includes a first actuator motor 212 and a second actuator motor 214. The first barrel cam 202 is coupled to the first actuator motor 212 via a first actuator gear assembly 216, and the second barrel cam 204 is coupled to the second actuator motor 214 via a second actuator gear assembly 218. The first actuator gear assembly 216 and the second actuator gear assembly 218 may couple to the first barrel cam 202 and the second barrel cam 204 proximate to the central location of the bushing 226, such that the first barrel cam 202 and the second barrel cam 204 may be independently rotated either clockwise or counterclockwise via force applied by the respective actuator gear assembly at approximately the center of the barrel cam. The first actuator gear assembly 216 and the second actuator gear assembly 218 may be arranged along a shared axis 260, where the axis 260 is parallel to rotational axis 251 of the first barrel cam 202 and second barrel cam 204. The central positioning of first actuator motor 212 and second actuator motor 214 and arrangement of the first actuator gear assembly 216 and the second actuator gear assembly 218 along the axis 260 may result in a reduced amount of space occupied by the motors and gear assemblies and a more compact arrangement of transmission components. For example, the configuration described above may result in a reduced packaging space of the shift assembly 200 relative to a configuration in which the first actuator motor 212 and the second actuator motor 214 are arranged at either ends of the barrel cam. In one example, actuator motor assembly 210 may be bolted to a gearbox housing portion 220, such that the actuator motor assembly 210 lies outside the gearbox while the barrel cam lies inside the gearbox proximate a transmission, and where the actuator motor assembly 210 is coupled to the first barrel cam 202 and second barrel cam 204 via actuator gear assemblies 216 and 218, respectively. The actuator gear assemblies 216 and 218 may be referred to herein as reduction gearings and/or reduction gearing assemblies.

In the example shown, an oil temperature sensor 221 is arranged within the gearbox housing portion 220, proximate to the first actuator gear assembly 216, the second actuator gear assembly 218, the first actuator motor 212, and the second actuator motor 214. The oil temperature sensor 221 may be electrically coupled to a controller of the vehicle including the shift assembly 200 (e.g., the controller 110 described above with reference to FIG. 1), and the controller may determine the temperature of oil within the transmission (e.g., within the gearbox housing portion 220) via signals (e.g., electronic signals) transmitted to the controller by the oil temperature sensor 221.

First barrel cam 202 and second barrel cam 204 may have a first cam track 228 and a second cam track 230, respectively, cut on them to serve as shift fork position grooves, by which a first shift fork 222 and a second shift fork 224, respectively, may be moved along a gear selector shaft 232 (e.g., along axis 253, parallel to axis 251 and axis 260). The first shift fork 222 and the second shift fork 224 may be coupled with the first barrel cam 202 and a second barrel cam 204 via a first shift fork following pin 246 and a second shift fork following pin 248, respectively, whereby the first shift fork following pin 246 slides along the first cam track 228 and the second shift fork following pin 248 slides along the second cam track 230. Thus, as first barrel cam 202 rotates, the first shift fork following pin 246 follows the first cam track 228, causing the first shift fork 222 to slide in one direction or another along the gear selector shaft 232 in parallel with the axis of the barrel cam, depending on the position of the first cam track 228 at the point where it meets the first shift fork following pin 246. As first shift fork 222 slides along the gear selector shaft 232, it slides a first clutch collar 240 along a transmission output shaft 244 of a transmission. The transmission may be the same as or similar to transmission 104 of vehicle 100, and the output shaft 244 may be the same as or similar to output shaft 108 of vehicle 100.

Similarly, as second barrel cam 204 rotates, the second shift fork following pin 248 follows the second cam track 230, causing the second shift fork 224 to slide in one direction or another along the gear selector shaft 232 in parallel with the axis of the barrel cam, depending on the position of the second cam track 230 at the point where it meets the second shift fork following pin 248. As second shift fork 224 slides along the gear selector shaft 232, it slides a second clutch collar 242 along transmission output shaft 428 of the transmission. The interaction between the first shift fork 222 and the second shift fork 224 and the transmission is discussed in further detail below in relation to FIG. 4.

The shift assembly 200 may be configured such that one or more gears of a transmission (e.g., similar to the transmission 104 shown by FIG. 1 and described above) may be engaged or disengaged via the first barrel cam 202, and one or more different gears of the transmission may be engaged or disengaged via the second barrel cam 204. For example, engagement or disengagement of the third gear of the transmission may be controlled by rotation of the second barrel cam 204, while engagement or disengagement of the first gear and second gear may be controlled by rotation of the first barrel cam 202. During conditions in which the gear engagement is shifted from second gear to third gear, a controller (such as the electronic controller 110 of vehicle 100 of FIG. 1) may rotate the third gear independently relative to rotation of the second gear. The controller may also independently control the rotational speed of each of the first barrel cam 202 and the second barrel cam 204 in order to increase shift performance. For example, the controller may initiate rotation of the second barrel cam 204 prior to initiating rotation of the first barrel cam 202, or may rotate the second barrel cam 204 at a different rotational speed than the first barrel cam 202, in order to reduce a transition time from engagement of the second gear to engagement of the third gear. This enables the shifting of gears to be adjusted according to one or more conditions or vehicle operating parameters, in order to vary the dynamic friction overlap of off-going and on-coming elements (e.g., gear phasing). Gear phasing is discussed in further detail below with reference to FIGS. 6-7.

In addition to increasing shift performance, the use of a split-barrel cam in shift assembly 200 has additional benefits. Because the first barrel cam 202 is driven by a first actuator motor 212 (which may be referred to herein as a first motor and/or first power source), the second barrel cam 204 is driven by a second actuator motor 214 (which may be referred to herein as a second motor and/or second power source), and the first barrel cam 202 and second barrel cam 204 are rotatable independent of each other, a size of the first barrel cam 202 and the second barrel cam 204 may be reduced relative to configurations that include a single barrel cam. For example, some conventional systems are configured to control engagement and disengagement of each gear of the transmission via a larger, single barrel cam. However, by configuring the shift assembly 200 to include the first barrel cam 202 and the second barrel cam 204 as described herein, a rotational inertia of the first barrel cam 202 and a rotational inertia of the second barrel cam 204 may be decreased relative to a rotational inertia of the conventional, single barrel cam. Further, because the first barrel cam 202 and second barrel cam 204 are rotated via the first actuator motor 212 and the second actuator motor 214 respectively, a load on each of the first actuator motor 212 and the second actuator motor 214 may be reduced relative to configurations that include load applied to a single motor, and a size of each of the first actuator motor 212 and the second actuator motor 214 may be reduced. The reduced load applied to the first actuator motor 212 and the second actuator motor 214 and the reduced rotational inertia of the first barrel cam 202 and the second barrel cam 204 may additionally reduce a likelihood of degradation of the first actuator motor 212, the second actuator motor 214, the first barrel cam 202, and the second barrel cam 204, and other components of the shift assembly 200.

Additionally, in the configuration described herein, the first actuator motor 212 and the second actuator motor 214 may apply force to the first barrel cam 202 and second barrel cam 204 proximate to a location at which the first barrel cam 202 and second barrel cam 204 are rotatably coupled to each other (e.g., coupled such that the first barrel cam 202 and second barrel cam 204 may rotate relative to each other), such as at opposing sides of a bushing arranged between the first barrel cam 202 and second barrel cam 204. By applying force to the first barrel cam 202 and second barrel cam 204 in this way, a reduced amount of force may be applied in order to initiate rotation of the first barrel cam 202 and second barrel cam 204, control of the rotation of the first barrel cam 202 and second barrel cam 204 may be increased, and a likelihood of degradation of the first barrel cam 202 and second barrel cam 204 may be decreased.

Another benefit of the independent operation of first barrel cam 202 and second barrel cam 204 is that the controller may be configured to switch between various control modes of the shift assembly 200 for different uses (e.g., different driving conditions, different user preferences, etc.). For example, an operator of a vehicle (e.g., vehicle 100 of FIG. 1) may input a selection of a desired operating mode via a user input device (e.g., a lever, button, touchscreen, etc.), and the controller may adjust operation of the shift assembly 200 according to the selected operating mode. One example mode may include a shift timing configured to provide smoother shifting under heavy loads, while another mode may be configured to provide increased shift performance for high vehicle speed applications.

The independent operation of the two barrel cams also enables gear shifting in a non-sequential order (e.g., gear skipping). For example, in some conditions, shifting efficiency and/or speed may be increased by shifting directly from one gear to another in a non-sequential order (e.g., shifting from first gear directly to third gear, or vice versa, without engaging the second gear during the shift between first gear and third gear). Such conditions may include operating the vehicle with the first gear of the transmission engaged and increasing a speed of the vehicle above a threshold speed while the first gear is still engaged. Responsive to the speed of the vehicle increasing above the threshold speed while the first gear is engaged, the controller may adjust operation of the shift assembly to shift directly from engagement of the first gear to engagement of the third gear, without engaging the second gear. The non-sequential shifting order may increase vehicle performance and/or efficiency. Gear skipping is discussed in further detail below with reference to FIGS. 6-7.

It should be further appreciated that because each of the first barrel cam 202 and second barrel cam 204 may be rotated independently, during some conditions the controller may rotate the first barrel cam 202 and second barrel cam 204 in order to engage multiple gears of the transmission at once in order to lock an output of the transmission. For example, the controller may concurrently engage the first gear via the first barrel cam 202 and the third gear via the second barrel cam 204 to lock the transmission while the vehicle is parked. In this way, the position of the vehicle may be maintained by the transmission to reduce a likelihood of undesired movement of the vehicle.

Referring now to FIG. 3, an enlarged view a portion of the actuator motor assembly 210 that includes the first actuator motor 212 is shown. While the enlarged view shows components relating to first actuator motor 212, it should be appreciated that similar components may be found and similar actions may be triggered with respect to second actuator motor 214, also housed within actuator motor assembly 210. Therefore, each of the components mentioned below may have a counterpart relating to second actuator gear assembly 218 and second barrel cam 204.

The first actuator motor 212 may be attached to the gearbox housing portion 220 via motor bearings 302 and 304, such that the first actuator gear assembly 216 may be driven to rotate the first barrel cam 202 in order to engage a selected gear. A position sensor 306 is shown proximate the first actuator gear assembly 216, bolted to the housing of the actuator motor assembly 210 via a position sensor retaining bolt 308, at a location where position sensor retaining bolt 308 does not obstruct the movement of the first actuator gear assembly 216. The position sensor 306 is depicted as electronically coupled to the controller, such that the rotational position of the first actuator gear assembly 216 (and the first barrel cam 202) may be communicated to the controller in order to determine, in conjunction with signals (e.g., electronic signals) from one or more of a plurality of sensors (e.g., engine speed sensors, vehicle speed sensors, wheel torque sensors, throttle position sensors, etc.), whether to shift gears and what gear to shift into.

For example, a vehicle such as vehicle 100 with a shift assembly 200 may be driving with the transmission engaged in first gear. As explained in further detail in relation to FIG. 4, first gear may correspond to a first position of the first shift fork 222 on the gear selector shaft 232. The position of the first shift fork 222 on the gear selector shaft 232 is based on the position of the first shift fork following pin 246 on the first cam track 228, such that as the first barrel cam 202 rotates, the first shift fork following pin 246 slides the first shift fork 222 left or right depending on rotational position of first barrel cam 202. Thus, first gear corresponds to a specific rotational position of the first barrel cam 202 around its axis. As mentioned earlier, the rotational position of the first barrel cam 202 is divided into discrete measurements via the detent grooves 234, whereby the rotational position of first barrel cam 202 may correspond to a specific gear position (e.g., a position at which a specific gear of the transmission is engaged) to ensure accurate rotational positioning for full gear engagement.

As vehicle 100 speeds up, electronic controller 110 may receive indications of vehicle speed from sensors on vehicle 100 (e.g., pedal position sensors, throttle sensors, wheel sensors, etc.). Additionally, electronic controller 110 may receive from position sensor 306 an indication that first barrel cam 202 has been rotated to a position corresponding to first gear. When the speed of vehicle 100 exceeds a threshold value for first gear (e.g., 10 miles per hour), electronic controller 110 may signal to the first actuator motor 212 to engage the first actuator gear assembly 216 in order to rotate first barrel cam 202 to a rotational position corresponding to second gear. As first barrel cam 202 rotates, the point of contact between the first shift fork following pin 246 and the first cam track 228 may shift horizontally along the selector shaft 232, dragging the first shift fork 222 through a neutral position to a position where first shift fork 222 engages second gear of the transmission 104 of vehicle 100. When first barrel cam 202 has rotated to the rotational position corresponding to second gear, position sensor 306 may indicate to electronic controller 110 that vehicle 100 is in second gear. It should be appreciated that as the transition between first and second gears is accomplished via the first barrel cam 202, without the involvement of the second barrel cam 204, the second barrel cam 204 may remain in a neutral position during the transition between first and second gears, whereby the second shift fork 224 is positioned such that gears of the transmission are not engaged by second shift fork 224. Operating the vehicle with the first barrel cam 202 and second barrel cam 204 in the neutral position may be referred to herein as a neutral mode of the vehicle, while operating the vehicle with the gears of the transmission engaged (e.g., with only the first gear engaged, with only the second gear engaged, or with only the third gear engaged) may be referred to herein as a drive mode of the vehicle.

Similarly, when electronic controller 110 receives signals from sensors such as pedal position sensors, throttle sensors, wheel sensors, etc., that the speed of vehicle 100 has exceeded a threshold value for second gear (e.g., 20 miles per hour), electronic controller 110 may signal to the first actuator motor 212 to engage the first actuator gear assembly 216 in order to rotate first barrel cam 202 to a rotational position corresponding to neutral. As first barrel cam 202 rotates, the linear position of first cam track 228 at the point of contact with first shift fork following pin 246 may shift along a selector shaft 232, dragging the first shift fork 222, via the first shift fork following pin 246, to first shift fork 222's neutral position. Independently, the electronic controller 110 may signal to the second actuator motor 214 to engage the second actuator gear assembly 218 to rotate second barrel cam 204 to a rotational position corresponding to third gear. As the second barrel cam 204 rotates, the linear position of the second cam track 230 at the point of contact with the second shift fork following pin 248 may shift along the selector shaft 232, dragging the second shift fork 224, via the second shift fork following pin 248, to a position where the second shift fork 224 engages third gear of the transmission 104. When the first barrel cam 202 has rotated to the rotational position corresponding to neutral and the second barrel cam 204 has rotated to the rotational position corresponding to third gear, position sensor 306 may indicate to electronic controller 110 that vehicle 100 is in third gear. Engagement and disengagement of the gears of the transmission 104 via the shift forks is described in further detail below with respect to FIG. 4.

The split-barrel cam actuator disclosed herein provides independent operation of the first barrel cam 202 and the second barrel cam 204. In this configuration, the transmission may shift directly between the various gears on demand, providing greater shift control flexibility and calibration. Conventional systems include transmission gears that are configured to engage in a pre-determined order.

However, the system of the present disclosure may initiate a transition to engage one gear (e.g., third gear) via second shift fork 224 prior to fully disengaging a previous gear (e.g., second gear) via first shift fork 222, in order to facilitate more rapid and efficient gear shifting under certain conditions.

For example, while driving in second gear, if vehicle 100 achieves a vehicle speed that exceeds a threshold for shifting into third gear (e.g., 20 miles an hour), the electronic controller 110 may coordinate the disengagement of second gear via the first actuator motor 212 with the engagement of third gear via the second actuator motor 214, such that first barrel cam 202 is rotated to disengage from second gear and second barrel cam 204 is rotated to engage in third gear slightly prior to full disengagement from second (referred to herein as gear phasing). Altering the speed of each barrel cam provides for for independent control behavior, which may increase shifting efficiency. In some conditions, gear phasing as described above may provide increased fuel efficiency and increased driver comfort (e.g., due to a decreased likelihood of abrupt shift changes). In some examples, the controller may utilize one or more learning algorithms to adjust shift operation based on previous operating conditions, and the adjusted shift operation may reduce a likelihood of transmission degradation (e.g., reduce transmission wear).

Further, while driving in first gear, if a shift condition is met for shifting into third gear, the electronic controller 110 may activate the first actuator motor 212 and the second actuator motor 214 concurrently in order to rotate first barrel cam 202 and second barrel cam 204 to disengage first gear and engage third gear directly, transitioning directly from first gear to third gear and skipping engagement of the second gear. For example, while driving in first gear, a shift condition may be met for shifting into second gear if vehicle 100 achieves a speed above a threshold speed (e.g., 20 miles an hour) and the average acceleration of vehicle 100 over a duration prior to reaching the threshold speed (e.g., the second prior to reaching the threshold speed) is below a threshold acceleration (e.g., 2.5 m/s2 or 6 mph/s). Alternatively, a shift condition may be met for shifting into third gear if vehicle 100 achieves a speed above the threshold speed and the average acceleration of vehicle 100 is above the threshold acceleration. The decision of whether to shift from first gear to second gear or to shift from first gear to third gear while skipping second gear may be based on other or additional factors. For example, commanded gear skipping during an upshift may be performed if the weight of the vehicle load is below a threshold value, and the acceleration is above a threshold value, and the controller determines that the resulting gear can handle the load. As another example, commanded gear skipping during an upshift (e.g., shifting directly from engagement of the first gear to engagement of the third gear) may be performed responsive to pedal lift off and/or during conditions of low throttle (e.g., relatively low amount of throttle opening) while operating in a fuel economy mode of the vehicle (e.g., a mode configured to control shift operation to reduce a fuel consumption of the vehicle). Commanded gear skipping during a downshift may be performed during wide open throttle (WOT) to achieve increased wheel torque with reduced shift interruption, or during a transition from operating the vehicle at a relatively high vehicle speed condition to operating the vehicle in a stationary position condition (e.g., a parked position). The commanded gear skipping during the downshift may occur as the vehicle speed decreases from the relatively high vehicle speed to the stopped condition. In some cases, a threshold speed for shifting into a gear of the transmission may be different from a threshold speed for shifting out of the same gear of the transmission, for example, to reduce a likelihood of a situation in which alternating shift conditions are repeatedly met, such as when the speed of vehicle 100 hovers around a threshold speed for shifting gears.

Further still, responsive to user input, such as pushing a button/switch, touching a touchscreen, or otherwise indicating that a parking condition is desired, independent actuation of first barrel cam 202 and second barrel cam 204 may be utilized to engage both first and third gears concurrently while vehicle 100 is not moving in order to lock the geartrain to the stationary housing. In this configuration, the rotational position of the wheels of the vehicle may be maintained by the transmission such that the wheels do not rotate. As one example, this configuration may be utilized for parking the vehicle (e.g., to supplement, or substitute for, a chassis parking brake).

Figure 4:
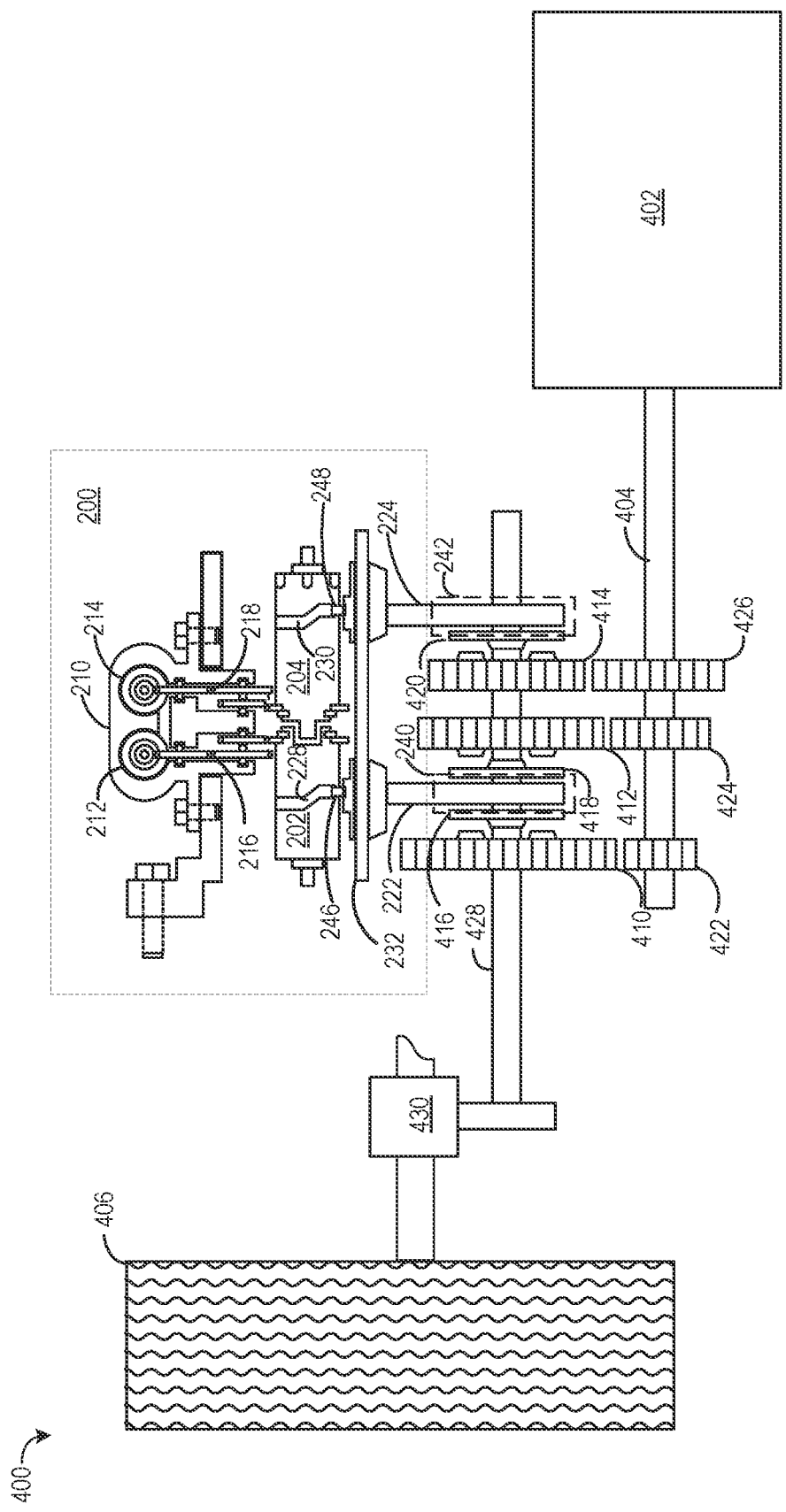
FIG. 4 shows the shift assembly of FIG. 2 coupled to a plurality of gears of a transmission.

Referring now to FIG. 4, transmission engagement diagram 400 shows how the split-barrel cam actuator system exemplified in FIGS. 2 and 3 engages the gears of a transmission such as transmission 104 of vehicle 100 of FIG. 1. An electric motor 402 may be operably coupled to shift assembly 200 via transmission input shaft 404. Electric motor 402 may be the same as or similar to electric motor 102 of vehicle 100 of FIG. 1, or, as described with reference to FIG. 1, in other embodiments electric motor 402 may be replaced by an internal combustion engine, or transmission input shaft 404 may be driven by a combination of power generated by an electric motor and power generated by an internal combustion engine, for example in a hybrid vehicle. For the purposes of this disclosure, transmission input shaft 404 may be powered by various power sources, whether electric or utilizing a fuel such as gasoline, natural gas, diesel, etc.

As described below, as gears are shifted, the rotation of the transmission input shaft 404 is transmitted to transmission output shaft 428, which is rotatably coupled to a differential gear assembly 430, which in turn rotates a drive wheel 406. The transmission output shaft 428, the differential gear assembly 430, and the drive wheel 406 may be the same as or similar to the output shaft 108, differential gear assembly 124, and drive wheel 120 of vehicle 100 of FIG. 1. The transmission output shaft 428 may also be the same as or similar to the output shaft 244 of FIG. 2.

In an embodiment, a first gear 410, a second gear 412, and a third gear 414 rotate around the transmission output shaft 428. In other embodiments, additional gears may be included (e.g., fourth gear, fifth gear, reverse gear, etc.). For example, an embodiment with four gears may include a fourth gear that is engaged by second shift fork 224 of the shift assembly 200 described above, positioned on the transmission output shaft 428 on the opposite side of the second shift fork 224 as the third gear 414. Additionally or alternatively, first barrel cam 202 and/or second barrel cam 204 may be extended in length to include additional cam tracks that drive corresponding additional shift forks, such that additional gears may be added on the transmission output shaft 428. For example, second barrel cam 204 may be extended to include a third cam track, that drives a third shift fork to engage a fifth gear with a smaller gear ratio than fourth gear (e.g., overdrive). As a result, the split-barrel actuator mechanism disclosed herein may be used with a different number of gears.

FIG. 4 depicts an input shaft 404 positioned in parallel with and proximate the transmission output shaft 428, around which a first input shaft gear 422, a second input shaft gear 424, and the third input shaft gear 426 rotate, which are rotatably coupled to the first gear 410, the second gear 412, and the third gear 414, respectively. Via the input shaft 404, the torque generated on the transmission output shaft 428 by electric motor 402 is transferred to the differential gear assembly 430 and the drive wheel 406 in accordance with a particular gear ratio for the relevant gear. As an example, in an embodiment, the first input shaft gear 422 is rotatably coupled to the first gear 410 at a gear ratio of 3.666, the second input shaft gear 424 is rotatably coupled to the second gear 412 at a gear ratio of 2.047, and the third input shaft gear 426 is rotatably coupled to the third gear 414 at a gear ratio of 1.258. Thus, when the vehicle is in first gear, the first input shaft gear 422 engages with the first gear 410 such that the transmission input shaft 404 completes 3.666 rotations in order for the transmission output shaft 428 to complete a single rotation. When the vehicle is in second gear, the second input shaft gear 424 engages with the second gear 412 such that the transmission input shaft 404 completes 2.047 rotations in order for the transmission output shaft 428 to complete a single rotation. When the vehicle is in third gear, the third input shaft gear 426 engages with the third gear 414 such that the transmission input shaft 404 completes 1.258 rotations in order for the transmission output shaft 428 to complete a single rotation. The gear ratios described herein are for illustrative purposes, and other gear ratios may be substituted without departing from the scope of this disclosure.

Gears 410, 412, and 414 are engaged by the shift assembly 200 via first shift fork 222 and second shift fork 224. As described above, first actuator motor 212 and second actuator motor 214 are activated by a controller (e.g., the electronic controller 110 of vehicle 100) in order to engage the first barrel cam 202 and the second barrel cam 204 via first actuator gear assembly 216 and second actuator gear assembly 218, respectively. The rotational position of first barrel cam 202 aligns first shift fork 222 along gear selector shaft 232 according to the position of first shift fork cam following pin 246 within first cam track 228. Similarly, the rotational position of second barrel cam 204 aligns second shift fork 224 along gear selector shaft 232 according to the position of second shift fork cam following pin 248 within second cam track 230. Thus, the rotational positions of first barrel cam 202 and second barrel cam 204 determine the positions of the first clutch collar 240 and the second clutch collar 242 attached to the first shift fork 222 and second shift fork 224 at the location of the transmission output shaft 428.

The first clutch collar 240 and the second clutch collar 242 rotate freely during the engagement and disengagement of gears. First clutch collar 240 and second clutch collar 242 are moved horizontally either to the left or to the right along transmission output shaft 428 to engage and disengage gears in accordance with the movement of first shift fork 222 and second shift fork 224, respectively, as described earlier. Clutch collars 240 and 242 engage the gears positioned on the right or to the left of clutch collars 240 and 242 via synchronizer ring/cone clutch assemblies 416, 418, and 420, whereby a clutch collar engages the relevant gear by sliding to connect the teeth of a hub fixed to the transmission output shaft 428 with similarly sized teeth on the relevant gear.

For example, in the embodiment depicted in FIG. 4, to engage first gear, when the first shift fork 222 is moved to the left via the rotation of first barrel cam 202 as described above, first clutch collar 240 slides synchronizer ring/cone clutch assembly 416 from the neutral position (e.g., in which no gears are engaged) to the left to engage first gear 410. First gear 410 engages first input shaft gear 422, which is rotated by the motor 402 via the input shaft 404, to turn the drive wheel 406. To disengage first gear and enter into second gear, the first shift fork 222 is moved to the right via the rotation of first barrel cam 202 in the opposite direction, and first clutch collar 240 slides synchronizer ring/cone clutch assembly 416 into the neutral position to the right to disengage first gear 410. Further rotation of the first barrel cam 202 slides first shift fork 222 to the right, whereby first clutch collar 240 slides synchronizer ring/cone clutch assembly 416 to the right to engage second gear 412. Second gear 412 engages second input shaft gear 424, which is rotated by the motor 402 via the input shaft 404, to turn the drive wheel 406. To disengage second gear and enter into third gear, the first shift fork 222 is moved to the left via the rotation of first barrel cam 202 in the opposite direction, and first clutch collar 240 slides synchronizer ring/cone clutch assembly 416 into the neutral position to the left to disengage second gear 412. Rotation of the second barrel cam 204 slides second shift fork 224 to the left, whereby second clutch collar 242 slides synchronizer ring/cone clutch assembly 418 to the left to engage third gear 414. Third gear 414 engages third input shaft gear 426, which is rotated by the motor 402 via the input shaft 404, to turn the drive wheel 406.

As mentioned above, it should be appreciated that because the rotation of first barrel cam 202 and the rotation of second barrel cam 204 can be actuated independently via first actuator motor 212 and/or second actuator motor 214, when disengaging second gear and entering into third gear, third gear can be "phased-in" by timing the rotation of second barrel cam 204 to initiate the transition of engagement of the third gear slightly before second gear is fully disengaged, thus increasing the speed and efficiency of shifting between second and third gears. Additionally, the independent actuation of first barrel cam 202 and second barrel cam 204 may provide for a drive controller such as electronic controller 110 of vehicle 100 to rotate first barrel cam 202 in order to move first shift fork 222 to disengage from first gear 410, and rotate second barrel cam 204 in order to move second shift fork 224 to engage third gear 414, thus skipping second gear. For example, if vehicle speed passes a first threshold speed for engaging second gear, and the controller detects acceleration above a threshold acceleration, the controller may determine that it would be more efficient not to engage second gear, but rather to wait until a second threshold speed is reached for engaging third gear. As mentioned above, first gear 410 and third gear 414 may also be engaged concurrently while the vehicle is not in motion in order to prevent the wheels from moving (e.g., to adjust the vehicle to a parked configuration).

Referring collectively to FIGS. 5A-5F, various rotational positions of a first barrel cam 500 and a second barrel cam 502 are shown. The first barrel cam 500 and second barrel cam 502 are in a coaxial arrangement (e.g., arranged along a shared rotational axis 550) spaced apart by bushing 526 and may be similar to, or the same as, the first barrel cam 202 and second barrel cam 204, respectively, described above with reference to FIGS. 2-4. The first barrel cam 500 and second barrel cam 502 may be commanded to the rotational positions shown by FIGS. 5A-5F via a controller of a vehicle, such as the electronic controller 110 of vehicle 100 shown by FIG. 1 and described above. For example, the controller may command the first barrel cam 500 to rotate in a first direction (e.g., clockwise) or a second direction (e.g., counter-clockwise) via a first motor (e.g., first actuator motor 212 shown by FIG. 2 and described above), and/or the controller may command the second barrel cam 502 to rotate in the first direction or second direction via a second motor (e.g., second actuator motor 214 shown by FIG. 2 and described above). The first barrel cam 500 is rotatable independently from the second barrel cam 502 such that the first barrel cam 500 may be rotated without rotating the second barrel cam 502, and vice versa.

The different rotational positions of the first barrel cam 500 and second barrel cam 502 correspond to different gear engagements of the transmission (e.g., similar to transmission 104 shown by FIG. 1 and described above). In particular, in the configuration shown by FIG. 5A, the gears of the transmission are not engaged. In the configuration shown by FIG. 5B, the first barrel cam 500 is rotated from the neutral position shown by FIG. 5A to a position in which the first gear (e.g., first gear of the gear sequence of the transmission) of the transmission is engaged. In the configuration shown by FIG. 5C, the first barrel cam 500 is further rotated from the position shown by FIG. 5B to a position in which the second gear (e.g., second gear of the gear sequence) of the transmission is engaged. In the configuration shown by FIG. 5D, the first barrel cam 500 is rotated to the neutral position, and the second barrel cam 502 is rotated from the neutral position shown by FIGS. 5A-5C to a position in which the third gear of the transmission (e.g., third gear of the gear sequence of the transmission) is engaged. In the configuration shown by FIG. 5E, the first barrel cam 500 and second barrel cam 502 are commanded to positions corresponding to engagement of both of the first gear and the third gear of the transmission (e.g., for parking of the vehicle). In the configuration shown by FIG. 5F, the first barrel cam 500 and second barrel cam 502 are each in a transitional position corresponding to adjustment from engagement of the second gear to engagement of the third gear. Gear engagement, as described herein, refers to engagement of the gears of the transmission for adjusting the output of the transmission (e.g., to propel the vehicle). For example, during conditions in which the first gear is engaged, a gear ratio of the transmission may higher (e.g., approximately 3.6), during conditions in which the second gear is engaged, the gear ratio may be lower (e.g., approximately 2.0), and during conditions in which the third gear is engaged, the gear ratio may be lower (e.g., approximately 1.2). However, during conditions in which both of the first gear and the third gear of the transmission are engaged (e.g., for maintaining the position of the vehicle while the vehicle is parked), the transmission does not provide output to the wheels of the vehicle (e.g., the output of the transmission is locked).

FIG. 5A shows the first barrel cam 500 and second barrel cam 502 each in a neutral rotational position. In this configuration, first shift fork following pin 512 is seated within a straight section 520 of cam track 504 of the first barrel cam 500, and second shift fork following pin 514 is seated within a straight section 522 of cam track 506 of the second barrel cam 502. The first shift fork following pin 512, cam track 504, second shift fork following pin 514, and cam track 506 may be similar to, or the same as, the first shift fork following pin 246, first cam track 228, second shift fork following pin 248, and second cam track 230, respectively, described above with reference to FIGS. 2-4.

The cam track 504 of first barrel cam 500 includes straight section 520, a first angled section 516, and a second angled section 524. The cam track 506 of second barrel cam 502 includes straight section 522 and an angled section 518. FIGS. 5A-5F each show a flattened view of the first barrel cam 500 and second barrel cam 502, and it should be appreciated that the first barrel cam 500 and second barrel cam 502 each have a cylindrical shape, similar to the example of first barrel cam 202 and second barrel cam 204 described above. The first barrel cam 500 and second barrel cam 502 are shown in the flattened views for ease of illustration, with the degree markers shown along the sides of the first barrel cam 500 and second barrel cam 502 included to indicate portions along the cylindrical perimeter of the first barrel cam 500 and second barrel cam 502. For example, a first portion of first barrel cam 500 is indicated by the marker labeled 60 degrees and a second portion of the first barrel cam 500 is indicated by the marker labeled 120 degrees, with the second portion being offset from the first portion by 60 degrees around the rotational axis 550 of the first barrel cam 500 (e.g., similar to rotational axis 251 shown by FIG. 2 and described above). The straight section 520 extends along the perimeter of the first barrel cam 500 in a relatively straight direction along the perimeter of the first barrel cam 500 (e.g., a direction around the rotational axis 550 of the first barrel cam 500, without bending or curving in a direction parallel with the rotational axis 550). The straight section 522 extends along the perimeter of the second barrel cam 502 in a relatively straight direction along the perimeter of the second barrel cam 502. In particular, in the flattened view shown by FIG. 5A, straight section 520 extends along axis 508, and straight section 522 extends along axis 510, where each of axis 508 and axis 510 represent paths encircling the rotational axis 550 of the first barrel cam 500 and second barrel cam 502.

As described with reference to the examples above, as the first shift fork following pin 512 moves (e.g., slides) within the cam track 504 of first barrel cam 500, the position of the first shift fork following pin 512 within the cam track 504 adjusts the position of the first shift fork to engage or disengage gears of the transmission. The first shift fork is configured to engage and disengage the first and second gears of the transmission based on the position of the first shift fork following pin 512 within the cam track 504. As the second shift fork following pin 514 moves (e.g., slides) within the cam track 506 of second barrel cam 502, the position of the second shift fork following pin 514 within the cam track 506 adjusts the position of the second shift fork to engage or disengage at least one gear of the transmission. The second shift fork is configured to engage and disengage the third gear of the transmission based on the position of the second shift fork following pin 514 within the cam track 506. While the first shift fork following pin 512 is positioned within straight section 520 of the cam track 504, the first shift fork does not engage any of the gears of the transmission (e.g., does not connect gears of the transmission to an output of the transmission), and while the second shift fork following pin 514 is positioned within the straight section 522 of the cam track 506, the second shift fork does not engage any of the gears of the transmission. In the condition shown by FIG. 5A, with the first shift fork following pin 512 in straight section 520 and the second shift fork following pin 514 in straight section 522, the transmission is in neutral (e.g., none of the gears of the transmission are engaged, and the gears do not drive the output of the transmission).

FIG. 5B shows the first barrel cam 500 rotated by 120 degrees around the rotational axis 550 relative to the position of the first barrel cam 500 shown by FIG. 5A, with the second barrel cam 502 in the same position as shown by FIG. 5A. In this configuration, the first shift fork following pin 512 is seated within the first angled section 516 of the cam track 504 of the first barrel cam 500. The first angled section 516 is formed by portions of the cam track 504 arranged at an angle relative to each other, as indicated by angle 552 between axis 554 and axis 556, where axis 554 and axis 556 are each not parallel to axis 508 shown by FIG. 5A. The position of the first shift fork following pin 512 within the first angled section 516 results in engagement of the first gear of the transmission by the first shift fork (e.g., engagement of the first gear of the gear sequence of the transmission).

FIG. 5C shows the first barrel cam 500 rotated by 120 degrees around the rotational axis 550 relative to the position of the first barrel cam 500 shown by FIG. 5B, with the second barrel cam 502 in the same position as shown by FIGS. 5A-5B. For example, in transitioning between the condition shown by FIG. 5A to the condition shown by FIG. 5B, the first barrel cam 500 is rotated independently of the second barrel cam 502 by 120 degrees in a first direction (e.g., clockwise), and in transitioning between the condition shown by FIG. 5B to the condition shown by FIG. 5C, the first barrel cam 500 is again rotated by 120 degrees in the first direction. In the configuration shown by FIG. 5C, the first shift fork following pin 512 is seated within the second angled section 524 of the cam track 504 of the first barrel cam 500. The second angled section 524 is formed by portions of the cam track 504 arranged at an angle relative to each other, as indicated by angle 560 between axis 562 and axis 564, where axis 562 and axis 564 are each not parallel to axis 508 shown by FIG. 5A. The position of the first shift fork following pin 512 within the second angled section 524 results in engagement of the second gear of the transmission by the first shift fork (e.g., engagement of the second gear of the gear sequence of the transmission).

FIG. 5D shows the first barrel cam 500 rotated by 120 degrees around the rotational axis 550 relative to the position of the first barrel cam 500 shown by FIG. 5C, with the second barrel cam 502 rotated around the rotational axis 550 by 120 degrees relative to the position of the second barrel cam 502 shown by FIGS. 5A-5C. In the configuration shown by FIG. 5D, the first shift fork following pin 512 is seated within the straight section 520 of the cam track 504 of the first barrel cam 500, and the first shift fork does not engage any gears of the transmission. However, the second shift fork following pin 514 is seated within the angled section 518 of the cam track 506, and as a result, the second shift fork engages the third gear of the transmission (e.g., the third gear of the gear sequence of the transmission is engaged). The angled section 518 is formed by portions of the cam track 506 arranged at an angle relative to each other, as indicated by angle 570 between axis 572 and axis 574, where axis 572 and axis 574 are each not parallel to axis 508 shown by FIG. 5A.

FIG. 5E shows the first barrel cam 500 rotated to be in the same configuration as shown by FIG. 5B (e.g., with the first gear of the transmission engaged as a result of the position of the first shift fork following pin 512 within the first angled section 516), and with the second barrel cam 502 in the same position as shown by FIG. 5D (e.g., with the third gear of the transmission engaged as a result of the position of the second shift fork following pin 514 within the angled section 518). In the configuration shown by FIG. 5E, both of the first gear of the transmission and the third gear of the transmission are engaged concurrently. As one example, the first gear and third gear may be engaged concurrently in order to lock the output of the transmission, such as for maintaining a position of the vehicle during conditions in which the vehicle is parked and not moving. The independent rotation of the first barrel cam 500 and second barrel cam 502 enables the first gear and third gear to be engaged concurrently, which may reduce a load on other components of the vehicle configured for parking of the vehicle (e.g., a parking brake) and/or reduce a likelihood of undesired movement of the vehicle.

FIG. 5F shows the first barrel cam 500 in a transitional rotational position in which the first shift fork following pin 512 slides between the straight section 520 and the second angled section 524. Additionally, the second barrel cam 502 is shown in a transitional rotational position in which the second shift fork following pin 514 slides between the straight section 522 and the angled section 518. As one example, the transitional configuration shown by FIG. 5F may correspond to a transition from engagement of the second gear of the transmission to engagement of the third gear of the transmission. In particular, the first barrel cam 500 may rotate to disengage the second gear of the transmission, and the second barrel cam 502 may rotate to engage the third gear of the transmission. The controller (e.g., electronic controller) may vary the rotational timing and/or rotational speed of the first barrel cam 500 and/or second barrel cam 502 (e.g., via adjustment of energization of the first motor configured to drive the first barrel cam 500 and the second motor configured to drive the second barrel cam 502) in order to adjust the timing of disengagement of the second gear of the transmission and engagement of the third gear of the transmission (or vice versa).

For example, because the second barrel cam 502 may be rotated independently of the first barrel cam 500, the controller may initiate rotation of the second barrel cam 502 to transition the engagement of the third gear of the transmission while the first barrel cam 500 is concurrently rotated to disengage the second gear of the transmission. The controller may initiate rotation of the second barrel cam 502 before the rotation of the first barrel cam 500 has disengaged the second gear of the transmission in order to reduce a duration of the transition from engagement of the second gear to engagement of the third gear. The controller may adjust the relative timing of the rotation of the first barrel cam 500 and second barrel cam 502 in order to more quickly transition from engagement of the second gear of the transmission to engagement of the third gear of the transmission, or vice versa. Further, the controller may adjust the timing of the independent rotation of the first barrel cam 500 and the timing of the independent rotation of the second barrel cam 502 in order to increasing shifting comfort (e.g., reduce an amount of noise and/or vibration associated with shifting) and/or compensate for drift of shift response time (e.g., due to degradation of transmission components, components of the shift assembly, etc.).

Thus, FIGS. 5A-5F show two coaxially aligned barrel cams, each of which includes a cam track, such that two shift forks may be moved independently along a gear selector shaft as their following pins trace the cam tracks. For example, the angled sections described above cause the following pins and corresponding shift forks to slide laterally into a commanded gear selection. In the example transmission described herein, the first shift fork is configured to engage a different number of gears (e.g., two gears) than the second shift fork (which may only engage one gear). As such, the first cam track of the first barrel cam may have a different shape than the second cam track of the second barrel cam. As shown in FIGS. 5A-5F, the first cam track may have two or more angled sections while the second cam track may have fewer angled sections, such as only one angled section. In this way, the two barrel cams may provide for for engagement of the third gear independent of engagement of the first and second gears, which may provide for gear phasing, skip shifting, and/or transmission locking.

Referring to FIGS. 6-7, flowcharts are shown illustrating example methods 600 and 700 for controlling operation of a transmission including a shift assembly. The shift assembly may be similar to, or the same as, the shift assembly 112 shown by FIG. 1 and/or the shift assembly 200 shown by FIG. 2 and described above. The transmission may be the same as or similar to transmission 104 of vehicle 100 of FIG. 1. Method 600 describes a procedure for adjusting the transmission to a commanded gear engagement based on the presence of a shift condition, and may be executed according to instructions stored in non-transitory memory of a controller, such as the electronic controller 110 of vehicle 100 of FIG. 1. Method 700 is a continuation of method 600 and may be executed by the controller responsive to certain vehicle operating conditions (e.g., conditions in which a shift condition is present).

The systems and components described herein with reference to FIGS. 6-7 may be similar to, or the same as, those discussed above with reference to FIGS. 1-4. However, in some examples, the methods 600 and 700 may be implemented by other systems, processors, or components without departing from the scope of this disclosure.

Referring now to FIG. 6, at 602, method 600 includes estimating and/or measuring vehicle operating conditions. Vehicle operating conditions may be estimated based on one or more outputs of various sensors of the vehicle (e.g., such as oil temperature sensors, engine speed or wheel speed sensors, torque sensors, cam position sensors, etc., as described above in reference to vehicle 100 of FIG. 1). Vehicle operating conditions may include engine speed and load, vehicle speed, rotational position of barrel cams of the shift assembly, transmission oil temperature, exhaust gas flow rate, mass air flow rate, coolant temperature, coolant flow rate, engine oil pressures (e.g., oil gallery pressures), operating modes of one or more intake valves and/or exhaust valves, electric motor speed, battery charge, engine torque output, vehicle wheel torque, etc.

At 604, method 600 includes determining transmission gear engagement based on a rotational position of first and second barrel cams of the shift assembly (e.g., first barrel cam 202 and second barrel cam 204 of shift assembly 200). As one example, the controller may determine that the first barrel cam is in a neutral rotational position (e.g., where the rotational position of the first barrel cam does not result in engagement of any gear of the transmission) while the second barrel cam is in a non-neutral rotational position (e.g., where the rotational position of the second barrel cam results in engagement of a gear of the transmission). As another example, the controller may determine that the second barrel cam is in a neutral rotational position (e.g., where the rotational position of the second barrel cam does not result in engagement of any gear of the transmission) while the first barrel cam is in a non-neutral rotational position (e.g., where the rotational position of the first barrel cam results in engagement of a gear of the transmission). As another example, the controller may determine that the first barrel cam and the second barrel cam may each be in a non-neutral rotational position (e.g., during conditions in which multiple gears of the transmission are engaged in order to lock the transmission). As another example, the controller may determine that the first barrel cam and the second barrel cam are each in a neutral rotational position (e.g., during conditions in which none of the gears of the transmission are engaged and the transmission does not output torque to drive shafts or other components to propel the vehicle). Various examples of rotational positions of barrel cams are shown by FIGS. 5A-5F and described above.

At 606, method 600 includes determining whether a shift condition is present. The shift condition may be one of a plurality of different conditions, as determined by the controller, resulting in a commanded adjustment to the current gear engagement of the transmission via the shift assembly. For example, the controller may continuously monitor one or more parameters (e.g., vehicle speed, accelerator pedal position, barrel cam position, etc.) and may determine that a shift condition is present based on the vehicle operating conditions. The determination of a shift condition may be based on factors including an estimated and/or predicted shifting speed, fuel efficiency, reduction of component wear and/or degradation, or a combination of these or other factors. As one example, the controller may determine whether a shift condition is present based on accelerator pedal position and vehicle speed (e.g., as shown by FIG. 9 and described below). For example, the determination of whether a shift condition is present may be performed by the controller via instructions stored in non-transitory memory of the controller, with the determination being a function of both accelerator pedal position and vehicle speed.

The determination of whether the shift condition is present may be based on input received by the controller from one or more sensors of the vehicle. For example, based on input from one or more cam position sensors, the controller may determine at 604 that the transmission of the vehicle is operating with the first gear of the transmission engaged (e.g., the first gear in the gear sequence of the transmission, with the engagement of the first gear resulting in a relatively high gear ratio at the output of the transmission relative to other gears of the transmission). Based on a vehicle speed sensor, the controller may determine that the vehicle speed and/or engine speed is above a pre-determined speed at which transitioning from engagement of the first gear to engagement of the second gear provides increased engine efficiency (e.g., to maintain the engine speed within a pre-determined range, where the pre-determined range includes engine speeds having a relatively high ratio of torque output versus fuel consumption). The controller may also determine from the vehicle speed sensor that the vehicle speed is increasing (e.g., based on engine speed, previous vehicle speeds, change in vehicle elevation, commanded fuel injection rate, etc.). Based on the aforementioned determinations (e.g., that the vehicle is being operated in the first gear, that the vehicle speed is above the threshold value, and that engine speed and/or vehicle speed is increasing), the controller may determine that a shift condition is present, and therefore the transmission of the vehicle may be shifted from operating with the first gear engaged to operating with the second gear engaged. Alternatively, if the controller determines that the vehicle is being operated in the second gear (e.g., the second gear in the sequence of gear ratios), and the engine speed sensors indicate that the vehicle speed and/or engine speed is decreasing and that the vehicle speed has fallen below a pre-determined speed at which transitioning from the second gear to the first gear provides increased engine efficiency, the controller may determine that a shift condition is present (e.g., that the vehicle may be shifted from second gear down to first gear).

The controller may determine whether or not a shift condition is present based on input from one or more cam position sensors (e.g., that indicate what gear a vehicle is in) in combination with a plurality of sensors that include engine speed sensors, wheel speed sensors, throttle sensors, pedal position sensors, oil temperature or pressure sensors, etc. The controller may determine whether the shift condition is present based on one or more algorithms stored in a memory of the controller, where in some examples the algorithms may be updated responsive to changes in vehicle conditions (e.g., degradation of one or more transmission components) and/or operating driving habits via application of one or more of artificial intelligence (AI), machine learning, and/or data analytics. In some examples, the controller may determine whether the shift condition is present based on a pre-determined vehicle operating mode selected by an operator of the vehicle via a user input device (e.g., button, switch, touchscreen, etc.). For example, a first vehicle operating mode may be configured such that the controller determines that the shift condition is present during conditions in which the vehicle speed is outside of a first pre-determined range of vehicle speeds (e.g., 10 MPH to 20 MPH) while operating with only the first gear of the transmission engaged. During conditions in which a different, second vehicle operating mode is selected, the controller may determine that the shift condition is present while the engine speed is outside of a different, second pre-determined range of engine speeds (e.g., 20 MPH to 30 MPH). The first vehicle operating mode may correspond to a fuel economy mode, for example, while the second vehicle operating mode may correspond to a high torque output mode.

If it is determined at 606 that a shift condition is not present, method 600 proceeds to 608, and the transmission operating conditions are maintained. Maintaining the transmission operating conditions may include maintaining the current gear engagement of the transmission and not adjusting the gear engagement. Maintaining the transmission operating conditions may further include continuing to receive data from transmission sensors such as cam position sensors, oil temperature sensors, oil pressure sensors, etc., maintaining the flow of oil in the transmission, etc.

However, if the controller determines at 606 that a shift condition is present, method 600 proceeds to 610, and the controller adjusts the transmission directly to a commanded gear engagement by independently rotating the first barrel cam and/or second barrel cam based on the shift condition at 606. As described herein, adjusting the transmission directly to a commanded gear engagement may include transitioning through configurations in which no gears of the transmission are engaged (e.g., neutral configurations). For example, if the vehicle is operating in the second gear (e.g., the second gear in the sequence of gear ratios) when the controller determines that the shift condition is present (e.g., the estimated and/or measured vehicle speed exceeds the threshold vehicle speed as described above), the controller may initiate a transition from operating the transmission with the second gear engaged to operating the transmission with the third gear engaged by rotating the first barrel cam to a neutral position (e.g., a position in which the first barrel cam does not result in engagement of a gear of the transmission, such as the position shown by FIGS. 5A and 5D and described above) to disengage the second gear and rotating the second barrel cam from a neutral position to a position in which the third gear is engaged. Although the transition from engagement of the second gear to engagement of the third gear may include briefly operating the transmission in a neutral gear configuration (e.g., a configuration in which no gears of the transmission are engaged, such as while the second gear is disengaged and before the third gear is engaged), the transition may be referred to as shifting directly from second gear to third gear, Similar phrasing may be utilized herein with respect to other adjustments to the gear engagement of the transmission (e.g., shifting directly from first gear to third gear or vice versa, shifting directly from third gear to second gear, etc.). The commanded gear engagement is based on operating conditions of the vehicle. One example of commanded adjustment to the gear engagement includes disengaging the first gear of the transmission and engaging the second gear of the transmission (e.g., a higher or lower gear), as described above. Another example of commanded adjustment to the gear engagement includes disengaging the second gear and engaging the third gear of the transmission (e.g., similar to the adjusting the transmission from the configuration shown by FIG. 5C, to the transitional configuration shown by FIG. 5F, and to the configuration shown by FIG. 5D). Another example of commanded adjustment to the gear engagement includes engaging two gears of the transmission concurrently in order to maintain a position of the vehicle (e.g., to the configuration shown by FIG. 5E during conditions in which the vehicle is parked and not moving, as described further below).

The adjustment of the transmission to a commanded gear engagement may include controlling the speed of adjustment based on one or more conditions. In some examples, adjusting directly to the commanded gear engagement may include controlling adjustment speed to the commanded gear engagement based on gearbox oil temperature at 612. The gearbox oil temperature may be referred to herein as transmission oil temperature and may be a temperature of oil within the transmission (e.g., at a gearbox portion of the transmission configured to house the gears of the transmission). As one example, the gearbox oil temperature may be a temperature of oil flowing within transmission 104 as measured by controller 110 via oil temperature sensor 115 shown by FIG. 1 and described above. As another example, the gearbox oil temperature may be measured by oil temperature sensor 221 shown by FIG. 2 and described above. During operation of the vehicle, a temperature of the gearbox oil may increase or decrease based on driving conditions (e.g., vehicle speed, ambient temperature, etc.). During conditions in which the gearbox oil temperature is higher, a viscosity of the gearbox oil may be decreased. As a result of the decreased viscosity, the gears of the transmission may experience less resistance to movement (e.g., less resistance to engagement or disengagement). During such conditions, a relative timing of disengagement of the second gear (e.g., a timing of rotation of the first barrel cam to disengage the second gear) and engagement of the third gear (e.g., a timing of rotation of the second barrel cam to engage the third gear) may be adjusted by the controller based on a calculated or inferred viscosity of the gearbox oil associated with the temperature of the gearbox oil. For example, during conditions in which the gearbox oil temperature is below a first threshold value (e.g., 70 degrees Celsius, shortly after initiating driving), the timing of the disengagement of the second gear (e.g., the timing of rotation of the first barrel cam) may be advanced by time A, and/or the timing of the engagement of third gear (e.g., the timing of rotation of the second barrel cam) may be retarded by time B, in order to provide increased time for the shifting of gears (e.g., maintain a duration between completion of disengagement of the second gear and completion of engagement of the third gear at a commanded duration, where the commanded duration corresponds to an amount of time resulting in increased efficiency of the transmission).

For example, without adjusting based on the temperature of the gearbox oil, the the shift assembly may be operated with a rotation timing of the first barrel cam commanded according to a first pre-determined rotation timing and the rotation timing of the second barrel cam commanded according to a second pre-determined rotation timing. In this condition, as one example, completion of the rotation of the second barrel cam may occur one half-second after completion of the rotation of the first barrel cam (e.g., the duration between disengagement of the second gear and engagement of the third gear may be one half-second, although in some examples the duration may be a different amount). However, reducing the duration between disengagement of the second gear and engagement of the third gear may be desirable in order to increase an efficiency of the transmission (e.g., reduce a likelihood of a decrease in a torque output of the transmission). In order to reduce the duration between a completion of disengagement of the second gear and a completion of engagement of the third gear, the controller may maintain the duration between disengagement of the second gear and engagement of the third gear at a commanded duration by adjusting the rotation timing of the first barrel cam from the first pre-determined timing and/or adjusting the rotation timing of the second barrel cam from the second pre-determined timing, where the amount of adjustment to the rotation timing is based on the transmission oil temperature.

Adjusting the rotation timing of the first barrel cam and adjusting the rotation timing of the second barrel cam relative to each other may be referred to herein as adjusting the relative rotation timing of the first barrel cam and the second barrel cam. As one example, the controller may advance the rotation timing of the first barrel cam from the first pre-determined timing (e.g., initiate rotation of the first barrel cam earlier relative to the rotation of the first barrel cam according to the first pre-determined timing, responsive to the shift condition), or the controller may retard the rotation timing of the second barrel cam from the second pre-determined timing (e.g., initiate rotation of the second barrel cam later relative to the rotation of the second barrel cam according to the second pre-determined timing, responsive to the shift condition). Adjusting the relative rotation timing of the first barrel cam and the second barrel cam may therefore include advancing the rotation timing of the first barrel cam and maintaining the rotation timing of the second barrel cam (e.g., maintaining the rotation timing at the second pre-determined timing). The rotation timing of the first barrel cam may be advanced by one fourth-second, or the rotation timing of the second barrel cam may be retarded by one-fourth second, in one example (e.g., during conditions in which the oil temperature is a first, higher temperature, such as 65 degrees Celsius). In another example, the rotation timing of the first barrel cam may be advanced by one-eighth second, or the rotation timing of the second barrel cam may be retarded by one-eighth second (e.g., during conditions in which the oil temperature is a second, lower temperature, such as 60 degrees Celsius). Other timing adjustments are possible.

During conditions in which the gearbox oil temperature is above a second threshold value (e.g., 82 degrees Celsius, after prolonged driving), the timing of the disengagement of the second gear may be retarded by time C, and/or the timing of the engagement of third gear may be advanced by time D, in order to provide the shifting of gears to occur in a shorter period of time. As one example, the controller may retard the rotation timing of the first barrel cam from the first pre-determined timing (e.g., initiate rotation of the first barrel cam later relative to the rotation of the first barrel cam according to the first pre-determined timing, responsive to the shift condition), or the controller may advance the rotation timing of the second barrel cam from the second pre-determined timing (e.g., initiate rotation of the second barrel cam earlier relative to the rotation of the second barrel cam according to the second pre-determined timing, responsive to the shift condition). The rotation timing of the first barrel cam may be retarded by one fourth-second, or the rotation timing of the second barrel cam may be advanced by one-fourth second, in one example (e.g., during conditions in which the oil temperature is a first, higher temperature, such as 88 degrees Celsius). In another example, the rotation timing of the first barrel cam may be retarded by one-eighth second, or the rotation timing of the second barrel cam may be advanced by one-eighth second (e.g., during conditions in which the oil temperature is a second, lower temperature, such as 84 degrees Celsius). Other timing adjustments are possible.

In some examples, two or more of times A, B, C, and D may be the same, while in other examples, A, B, C, and D may be different times.

Adjusting the rotation timing of the barrel cams as described above may adjust the shift timing of the transmission from a pre-determined shift timing (e.g., a shift timing resulting from the first pre-determined timing of the first barrel cam and the second pre-determined timing of the second barrel cam), such that the time between disengagement of the second gear and engagement of the third gear, or vice versa (e.g., the time between disengagement of the third gear and engagement of the second gear), is reduced. As a result, shift performance may be increased (e.g., an amount of time to transition from one gear engagement to another may be decreased), and vehicle efficiency may be increased (e.g., an amount of fuel, or electrical power, used to provide torque to propel the vehicle may be reduced due to a decreased likelihood of a reduction of torque output by the transmission). In some examples, the pre-determined shift timing may correspond to a conventional shift timing of a conventional transmission (e.g., a shift timing that is not adjusted based on a learning algorithm, transmission oil temperature, or characteristics of the first barrel cam and second barrel cam). The adjustment of the transmission to a commanded gear engagement is discussed in further detail below with respect to FIG. 7.

In some examples, adjusting directly to the commanded gear engagement may include controlling adjustment speed and/or timing to the commanded gear engagement based on a learning algorithm at 614. The learning algorithm may be a machine learning algorithm, deep neural network, etc. stored in a memory of the controller (e.g., stored in learning module 111 of the controller 110 shown by FIG. 1 and described above). The learning algorithm may take as input shifting data collected over time, and the controller may adjust the timing and/or speed of the shifting of the transmission via the shift assembly based on the shifting data (e.g., to increase shifting efficiency). The shifting data used as input may include sensor data (e.g., from engine speed sensors, oil pressure or temperature sensors, etc.), and/or data recorded by the controller, such as transmission timing data (e.g., the start and end times of each gear engagement and/or disengagement, etc.), historical/statistical data (e.g., total/mean continuous driving time, time spent out of operation, etc.), age of various components, maintenance and/or repair information, and/or user input (e.g., type of oil used during a given time period, type of usage, driver information, etc.), and/or any other type of information relevant to shifting efficiency. The controller may adjust operation of the shift assembly based on the shifting data by adjusting timing for engaging and/or disengaging one or more gears when shifting under certain conditions, adjusting a speed of the shifting for specific gear combinations, adjusting conditions in which the controller commands the shift assembly to skip gears (e.g., shift directly from first gear to third gear, or vice versa), etc. The types of data described above as potential inputs to a learning algorithm and the adjustments performed by the controller output are non-limiting, and in some examples, other types of data may be used.

As one example, degradation of the transmission oil (e.g., gearbox oil), gears, or other components of the transmission may result in decreased shift performance over time (e.g., increased time to transition from one gear engagement to another). The reduction in shift performance due to transmission component degradation may be referred to herein as shift timing drift. The controller may determine (e.g., estimate and/or measure) the amount of shift timing drift and may adjust operation of the shift assembly via the learning algorithm in order to at least partially counteract the shift timing drift, whereby engine, driving, and/or shifting conditions may be compared to training data collected over a previous duration for adjusting the operation of the shift assembly. The adjustment to the operation of the shift assembly may include increasing and/or decreasing a rotation speed and/or relative rotation timing of the first barrel cam and/or the second barrel cam (e.g., a rotation speed of the first barrel cam relative to a rotation speed of the second barrel cam, a rotation starting timing of the first barrel cam relative to a rotation starting timing of the second barrel cam, etc.). By adjusting the operation of the shift assembly responsive to the shift timing drift, transmission efficiency (e.g., shift performance) may be increased, and a rate of increase of the shift timing drift may be reduced (e.g., the operation of the shift assembly may be adjusted in order to reduce further shift timing drift). Thus, shifting efficiency may be adjusted periodically and/or dynamically during operation in order to accommodate a range of conditions, driving styles, etc.

In some examples, the learning algorithm may adjust the operation of the shift assembly in combination with the adjustments based on transmission oil temperature described above. For example, the controller may adjust the rotation timing of the first barrel cam by a first adjustment amount (e.g., advance the rotation timing by one eighth-second) based on the oil temperature, and the controller may further adjust the rotation timing of the first barrel cam by a second adjustment amount (e.g., advance the rotation timing by one sixteenth-second) based on a predicted response rate of the first barrel cam determined via the learning algorithm. In other examples, the controller may adjust the rotation timing of the first barrel cam by a single adjustment amount determined via the learning algorithm, where the learning algorithm determines the adjustment amount at least partially as a function of the transmission oil temperature. For example, the controller may predict a response rate of the first barrel cam (e.g., a speed of rotation of the first barrel cam responsive to a given amount of energization of the first motor configured to drive the first barrel cam) via the learning algorithm, and the controller may adjust (e.g., increase or decrease) the predicted response rate based on the transmission oil temperature. The controller may control the first motor via a control signal (e.g., electronic command signal) transmitted from the controller to the first motor, where the control signal is based on the adjusted predicted response rate (e.g., the controller may determine parameters of the control signal, such as a pulse width of the control signal, responsive to the adjusted predicted response rate). As one example, the pulse width of the control signal may be increased or decreased responsive to conditions in which the adjusted predicted response rate is lower or higher, respectively (e.g., in order to increase or decrease, respectively, a duty cycle of the first motor).

In some examples, the predicted response rate of the first barrel cam and the predicted response rate of the second barrel cam may be different (e.g., for a same, given transmission oil temperature, such as 80 degrees Celsius, 75 degrees Celsius, etc.). As one example, the controller may determine that the predicted response rate of the second barrel cam is higher (e.g., faster) or lower (e.g., slower) than the predicted response rate of the first barrel cam via the learning algorithm. The predicted response rate of the first barrel cam and the predicted response rate of the second barrel cam may be determined by the controller via the learning algorithm based on vehicle operation data measured and stored by the controller over one or more durations of vehicle operation (e.g., several ON/OFF cycles of operation of the vehicle, as described above), with the vehicle operation data acquired by the controller from the various sensors of the vehicle (e.g., pedal position sensor 154, oil temperature sensor 115, wheel speed sensors 113, etc. shown by FIG. 1 and described above). As one example, controller may determine via the learning algorithm and based on the vehicle operation data that a previous, measured response rate of the first barrel cam is slower than a previous, measured response rate of the second barrel cam (e.g., due to a larger number of rotations of the first barrel cam relative to a number of rotations of the second barrel cam). The measured response rate of a given barrel cam (e.g., the first barrel cam or second barrel cam), as measured by the controller from the vehicle operation data, may correspond to a duration from an initiation of a commanded rotation of the given barrel cam to a completion of the commanded rotation of the given barrel cam, where the completion of the commanded rotation immediately follows the initiation of the commanded rotation. The controller may compare one or more previous measured response rates of the first barrel cam, for example, via the learning module in order to determine the predicted response rate of the first barrel cam (e.g., for the next commanded rotation of the first barrel cam). The controller may additionally track the transmission oil temperature associated with each of the one or more previous measured response rates of the first barrel cam with a current transmission oil temperature in order to adjust the predicted response rate of the first barrel cam based on the current transmission oil temperature (e.g., the transmission oil temperature as measured immediately prior to the next commanded rotation of the first barrel cam).

Referring now to FIG. 7, a flowchart illustrating method 700 is shown, where method 700 is a continuation of the method 600 described above. Method 700 is a method for adjustment of the transmission to a commanded gear engagement, as described above at 610 of FIG. 6. The components described herein with reference to method 700 may be the same as those described above with reference to method 600 of FIG. 6 (e.g., method 700 may be executed by the controller described above with reference to FIG. 6, the electronic controller 110 of vehicle 100 of FIG. 1, etc.).

At 702, method 700 includes determining whether the vehicle is stationary and a park lock is requested. The determination of whether the vehicle is stationary may include determining the vehicle speed based on one or more vehicle speed sensors, as described above. The shift condition described above with reference to 606 of FIG. 6 may be the park lock request. The determination of whether the park lock is requested may be based on input to one or more user interface devices of the vehicle (e.g., a park lock button located within a cabin of the vehicle, a position of a keyed ignition switch of the vehicle, etc.). The park lock may be requested, for example, in order to reduce a likelihood of undesired movement of the vehicle. As one example, during conditions in which a heavy load is applied to the vehicle while the vehicle is stationary and parked (e.g., on steep hills and/or while the vehicle weight is increased due to towing or hauling), it may be difficult to maintain the position of the vehicle with the parking brake. However, by locking the output of the transmission, the position of the vehicle may be more easily maintained. Locking the output of the transmission includes engaging more than one gear of the transmission concurrently in order to lock a rotation of an output shaft of the transmission (e.g., transmission output shaft 428 described above with reference to FIG. 4). In some examples, the park lock may be requested by the user only during conditions in which the vehicle is stationary. As one example, the park lock may be requested during conditions in which signals (e.g., electronic signals) transmitted to the controller by one or more vehicle position sensors indicate that the vehicle is not in motion and the hydraulic brake and/or parking brake is applied in order to maintain the vehicle in the stationary position.

If the controller determines at 702 that the vehicle is stationary and a park lock is requested, method 700 proceeds to 704, and the controller locks the transmission output by engaging both of the first gear via the first barrel cam and the third gear via the second barrel cam. As mentioned above, responsive to user input such as pushing a button/switch, touching a touchscreen, or otherwise indicating that a parking condition is desired, the first barrel cam and the second barrel cam of the shift assembly, (e.g., the first barrel cam 202 and the second barrel cam 204 of shift assembly 200 of FIG. 2) are independently rotated to engage both first and third gears concurrently, while the vehicle is not moving, in order to lock the geartrain of the transmission to the stationary transmission housing. For example, the shift assembly may be adjusted by the controller to the configuration shown by FIG. 5E and described above. As one example, responsive to the determination that the park lock is requested at 702 and the vehicle is operating with the first gear engaged, the controller may maintain the position of the first barrel cam and may energize the second motor configured to drive the second barrel cam with a first polarity (e.g., a first electrical voltage delta across the second motor, which may be referred to herein as a forward polarity) in order to move the second barrel cam in a first direction (e.g., clockwise) and engage the third gear of the transmission concurrently with the engagement of the first gear of the transmission.

If the controller determines at 702 that the vehicle is not stationary (e.g., the vehicle is moving) and the park lock is not requested, method 700 proceeds from 702 to 706 where method 700 includes determining whether the second gear of the transmission is engaged. As described in relation to FIG. 7, references to "the first gear" refer to the first gear in the sequence of gear ratios, references to "the second gear" refer to the second gear in the sequence of gear ratios, and references to "the third gear" refer to the third gear in the sequence of gear ratios. For example, engagement of only the first gear of the transmission may result in a transmission gear ratio of approximately 3.6, engagement of only the second gear of the transmission may result in a transmission gear ratio of approximately 2.0, and engagement of only the third gear of the transmission may result in a transmission gear ratio of approximately 1.2. As one example, during operation of the vehicle on a flat, level surface, as the speed of the vehicle increases, the shift assembly may sequentially adjust the gear engagement of the transmission from engagement of the first gear, to engagement of the second gear, and then to engagement of the third gear. Further, as the vehicle speed decreases, the shift assembly may sequentially adjust the gear engagement of the transmission from engagement of the third gear, to engagement of the second gear, and then to engagement of the first gear.

At 706, the controller determines whether the second gear of the transmission is engaged. Determining whether the second gear of the transmission is engaged may include determining the rotational position of the first barrel cam and second barrel cam based on signals (e.g., electronic signals) transmitted to the controller by one or more cam position sensors, as described above. For example, the controller may determine that the second gear of the transmission is engaged during conditions in which the first barrel cam and second barrel cam are in the rotational positions shown by FIG. 5C and described above (e.g., such that a first shift fork following pin seated within a cam track of the first barrel cam is in a position resulting in engagement of the second gear by the first shift fork, while a second shift fork following pin seated within a cam track of the second barrel cam is in a position resulting in no gear engagement by the second shift fork).

If the second gear of the transmission is engaged at 706, the controller determines at 708 whether a shift up condition is present. For example, the controller may determine whether the shift condition described above at 606 of FIG. 6 is a shift up condition. The shift up condition is a condition in which the controller commands the shift assembly to adjust the transmission to a higher gear in the gear sequence. For example, as described above, the gear sequence of the transmission, in ascending order, may be engagement of the first gear, then engagement of the second gear, and then engagement of the third gear. Because the second gear of the transmission is engaged at 706 as described above, the shift up condition at 708 is a condition in which the controller commands the shift assembly to transition the transmission from engagement of the second gear to engagement of a higher gear in the gear sequence (e.g., the third gear). In the example described herein, the transmission includes three gears (e.g., first gear, second gear, and third gear). However, other examples may include a different number of gears (e.g., four gears).

In one example, the shift up condition may be a condition in which a speed of the vehicle exceeds a threshold vehicle speed, and/or a speed of the engine exceeds a threshold engine speed. For example, the threshold vehicle speed may be a pre-determined speed at which transitioning from the second gear to the third gear provides increased engine efficiency (e.g., to maintain the engine speed within a pre-determined range, where the range corresponds to a relatively high ratio of torque output versus fuel consumption), or conditions for upshifting may be met as vehicle speed increases when coasting downhill as the drive motor approaches the threshold speed. In some examples, as described below with reference to FIG. 9, the shift up condition may be a function of several vehicle operating parameters, such as vehicle speed and accelerator pedal position.

If the controller determines that the shift up condition is present at 708, the method continues from 708 to 710 where the method includes disengaging the second gear via the first barrel cam and shifting directly to engagement of the third gear via the second barrel cam. For example, the controller may disengage the second gear by rotating the first barrel cam to adjust the first shift fork following pin to a neutral position resulting in no gear engagement of the transmission via the first shift fork (e.g., a position in which neither of the first gear or second gear are engaged), and the controller may engage the third gear by rotating the second barrel cam to adjust the second shift fork following pin to a non-neutral position resulting in engagement of the third gear of the transmission via the second shift fork. In particular, disengaging the second gear and engaging the third gear may include adjusting the first barrel cam and second barrel cam to the positions shown by FIG. 5D and described above. Rotating the first barrel cam may include energizing the first motor configured to drive the first barrel cam with the first polarity in order to rotate the first barrel cam clockwise from the position shown by FIG. 5C to the position shown by FIG. 5D, and rotating the second barrel cam may include energizing the second motor configured to drive the second barrel cam with the first polarity in order to rotate the second barrel cam clockwise from the position shown by FIG. 5C to the position shown by FIG. 5D. As described above, a timing and/or speed of the rotation of the first barrel cam and the rotation of the second barrel cam, and the corresponding disengagement and engagement of gears, may be controlled by the controller based on vehicle operating conditions in order to increase shifting efficiency.

However, if the controller determines that the shift up condition is not present at 708, the method continues from 708 to 712 where the method includes shifting directly to first gear via the first barrel cam. In particular, the controller shifts the transmission from engagement of the second gear (e.g., similar to the configuration shown by FIG. 5C) to engagement of the first gear (e.g., similar to the configuration shown by FIG. 5B) by rotating the first barrel cam to adjust the position of the first shift fork via the first shift fork following pin. Rotating the first barrel cam to disengage the second gear and engage the first gear may include energizing the first motor configured to drive the first barrel cam with a second polarity (e.g., a second electrical voltage delta which may be referred to herein as a reverse polarity, where the reverse polarity is opposite to the forward polarity) in order to move the first barrel cam in a second direction opposite to the first direction (e.g., counter-clockwise).

Returning to 706, if at 706 it is determined that the second gear of the transmission is not engaged, the method proceeds from 706 to 714 where the method includes determining whether the first gear of the transmission is engaged. Determining whether the first gear of the transmission is engaged may include determining the rotational position of the first barrel cam and second barrel cam based on signals (e.g., electronic signals) transmitted to the controller by the one or more cam position sensors, as described above. For example, the controller may determine that the first gear of the transmission is engaged during conditions in which the first barrel cam and second barrel cam are in the rotational positions shown by FIG. 5B and described above (e.g., such that a first shift fork following pin seated within a cam track of the first barrel cam is in a position resulting in engagement of the first gear by the first shift fork, while a second shift fork following pin seated within a cam track of the second barrel cam is in a position resulting in no gear engagement by the second shift fork). The determination of whether the first gear is engaged at 706 refers to determining whether only the first gear is engaged.

If at 714 the controller determines that only the first gear is engaged, the method proceeds from 714 to 716 where the method includes determining whether a skip shift condition is present. For example, the controller may determine whether the shift condition described above at 606 of FIG. 6 is a skip shift condition. The skip shift condition is a condition in which the controller commands the shift assembly to adjust the transmission from the current gear engagement to a different gear engagement in an order that is not the same as the gear sequence of the transmission. For example, as described above, the gear sequence of the transmission, in ascending order, includes engagement of the first gear, then engagement of the second gear, and then engagement of the third gear. However, as one example, during conditions in which the skip shift condition is present, the controller may command the shift assembly to adjust the gear engagement of the transmission directly from engagement of the first gear to engagement of the third gear (e.g., skipping engagement of the second gear), as described below.

In one example, the skip shift condition may be a condition in which a speed of the vehicle exceeds a threshold vehicle speed, and/or a speed of the engine exceeds a threshold engine speed. For example, the threshold vehicle speed may be a pre-determined speed at which transitioning from the first gear directly to the third gear, without engaging the second gear, provides increased engine efficiency (e.g., to maintain the engine speed within a pre-determined range, where the range corresponds to a relatively high ratio of torque output versus fuel consumption), or conditions for skip shifting during an upshift may be met when vehicle speed increases rapidly when coasting downhill as the drive motor approaches a threshold speed. In some examples, as described below with reference to FIG. 9, the skip shift condition may be a function of several vehicle operating parameters, such as vehicle speed and accelerator pedal position.

For example, during conditions in which the vehicle is operated under heavy load (e.g., towing, hauling, etc.), the speed of the vehicle may be increasing while operating with the first gear engaged. As the speed of the vehicle increases above the pre-determined threshold vehicle speed (e.g., 10 miles an hour) at which the controller would normally shift transition the transmission from engagement of the first gear to engagement of the second gear (e.g., under lower load conditions), the controller may determine based on vehicle operating conditions (e.g., vehicle sensor data) that shifting to engagement of the second gear may reduce a forward momentum of the vehicle, leading to reduced vehicle speed and reduced fuel efficiency. The controller may determine (e.g., via a calculation, lookup table stored in non-transitory memory, etc.) that fuel efficiency may be increased by not transitioning from engagement of the first gear to engagement of the second gear but instead transitioning directly from engagement of the first gear to engagement of the third gear. In some examples, the controller may delay the transition from engagement of the first gear to engagement of the third gear based on vehicle operating parameters such as vehicle speed (e.g., the controller may command the shift assembly to maintain engagement of the first gear until the vehicle speed is above a second threshold vehicle speed, such as 30 miles an hour). In this example, the controller may skip the engagement of the second gear in order to maintain the forward momentum of the vehicle, and fuel efficiency may be increased. If at 716 it is determined that the skip shift condition is not present, the method proceeds from 716 to 720 where the method includes shifting directly to second gear via the first barrel cam. In particular, the controller shifts the transmission from engagement of the first gear (e.g., similar to the configuration shown by FIG. 5B) to engagement of the second gear (e.g., similar to the configuration shown by FIG. 5C) by rotating the first barrel cam to adjust the position of the first shift fork via the first shift fork following pin.

However, if the controller determines at 716 that the skip shift condition is present, the method proceeds from 716 to 718 where the method includes disengaging the first gear via the first barrel cam and shifting directly to the third gear via the second barrel cam. In particular, the controller shifts the transmission from engagement of the first gear (e.g., similar to the configuration shown by FIG. 5B) to engagement of the third gear (e.g., similar to the configuration shown by FIG. 5D) by rotating the first barrel cam to adjust the position of the first shift fork via the first shift fork following pin to disengage the first gear and by rotating the second barrel cam to adjust the position of the second shift fork via the second shift fork following pin to engage the third gear. As one example, because the first barrel cam and second barrel cam are rotatable independently of each other, the first barrel cam may be rotated in a first direction (e.g., counter-clockwise direction) to disengage the first gear of the transmission concurrently while the second barrel cam is rotated in an opposing, second direction (e.g., clockwise direction) to engage the third gear of the transmission. In some examples the controller may adjust the timing and/or speed of disengagement of the first gear and engagement of the third gear based on different vehicle operating parameters such as transmission oil temperature, via a learning algorithm similar to the example described above with reference to the transition between disengagement of the second gear and engagement of the third gear, etc.

Returning to 714, if the controller determines that the first gear is not engaged, the method proceeds from 714 to 722 where the controller determines if the third gear is engaged and a skip shift condition is present. Determining whether the third gear of the transmission is engaged may include determining the rotational position of the first barrel cam and second barrel cam based on signals (e.g., electronic signals) transmitted to the controller by the one or more cam position sensors, as described above. For example, the controller may determine that the third gear of the transmission is engaged during conditions in which the first barrel cam and second barrel cam are in the rotational positions shown by FIG. 5D and described above (e.g., such that the first shift fork following pin seated within the cam track of the first barrel cam is in a neutral position resulting in no engagement of transmission gears by the first shift fork, while the second shift fork following pin seated within the cam track of the second barrel cam is in a position resulting in engagement of the third gear of the transmission by the second shift fork). The determination of whether the third gear is engaged at 706 refers to determining whether only the first gear is engaged.

The determination of whether the skip shift condition is present at 722 may include determining whether the shift condition described above at 606 of FIG. 6 is the skip shift condition. The skip shift condition is a condition in which the controller commands the shift assembly to adjust the transmission from the current gear engagement to a different gear engagement in an order that is not the same as the gear sequence of the transmission, as described above (e.g., transitioning directly from engagement of the third gear to engagement of the first gear). As one example, the skip shift condition may be a condition in which a speed of the vehicle decreases below a threshold vehicle speed, and/or a speed of the engine decreases below a threshold engine speed. The threshold vehicle speed may be a pre-determined speed at which transitioning from the third gear directly to the first gear, without engaging the second gear, provides increased engine efficiency (e.g., to maintain the engine speed within a pre-determined range, where the range corresponds to a relatively high ratio of torque output versus fuel consumption), or conditions for skip shifting during a downshift may be met when vehicle speed decreases rapidly when driving uphill as the drive motor approaches a threshold speed, in order to reduce a likelihood of degradation of the driveline. In some examples, as described below with reference to FIG. 9, the skip shift condition may be a function of several vehicle operating parameters, such as vehicle speed and accelerator pedal position.

If the controller determines that the third gear is engaged and the skip shift condition is present at 722, the method continues from 722 to 724 where the method includes disengaging the third gear via the second barrel cam and shifting directly to first gear via the first barrel cam. In particular, the controller shifts the transmission from engagement of the third gear (e.g., similar to the configuration shown by FIG. 5D) to engagement of the first gear (e.g., similar to the configuration shown by FIG. 5B) by rotating the second barrel cam to adjust the position of the second shift fork via the second shift fork following pin to disengage the third gear and by rotating the first barrel cam to adjust the position of the first shift fork via the first shift fork following pin to engage the first gear. As one example, because the first barrel cam and second barrel cam are rotatable independently of each other, the first barrel cam may be rotated in a first direction (e.g., clockwise direction) to engage the first gear of the transmission concurrently while the second barrel cam is rotated in an opposing, second direction (e.g., counter-clockwise direction) to disengage the third gear of the transmission. In some examples the controller may adjust the timing and/or speed of engagement of the first gear and disengagement of the third gear based on different vehicle operating parameters such as transmission oil temperature, via a learning algorithm similar to the example described above with reference to the transition between disengagement of the first gear and engagement of the third gear (e.g., as described at 718), etc.

However, if the controller determines at 722 that the skip shift condition is not present, the method continues from 722 to 726 where the method includes disengaging the third gear via the second barrel cam and shifting directly to the second gear via the first barrel cam. In particular, although the shift condition is present as determined at 606 shown by FIG. 6, the controller determines at 722 that the shift condition is not the skip shift condition. As a result, at 726, the controller shifts the transmission from engagement of the third gear (e.g., similar to the configuration shown by FIG. 5D) to engagement of the second gear (e.g., similar to the configuration shown by FIG. 5C) by rotating the second barrel cam to adjust the position of the second shift fork via the second shift fork following pin to disengage the third gear and by rotating the first barrel cam to adjust the position of the first shift fork via the first shift fork following pin to engage the second gear.

Referring to FIG. 8, a graph 800 is shown illustrating various vehicle operating parameters for an example operation of a vehicle including a transmission and a shift assembly. Components described herein with reference to FIG. 8 may be similar to the components described above. For example, the vehicle, transmission, and shift assembly may be similar to, or the same as, the vehicle 100, transmission 104, and shift assembly 112 described above with reference to FIG. 1. The shift assembly may adjust the gear engagement of the transmission, similar to the examples described above with reference to FIGS. 2-4, FIGS. 5A-5E, and FIGS. 6-7. Operation of the shift assembly is controlled by a controller, similar to the controllers described above (e.g., electronic controller 110 shown by FIG. 1 and described above).

The plots shown by graph 800 illustrate operating parameters of the vehicle. In particular, plot 802 shows engine speed, plot 804 shows accelerator pedal position, plot 806 shows vehicle speed, plot 808 shows gear engagement of the transmission, plot 810 shows an energization of a first motor configured to drive a first barrel cam of the shift assembly (e.g., similar to the first actuator motor 212 configured to drive first barrel cam 202 shown by FIG. 2, the motor configured to drive first barrel cam 500 described above with reference to FIGS. 5A-5F, etc.), plot 812 shows an energization of a second motor configured to drive a second barrel cam of the shift assembly (e.g., similar to the second actuator motor 214 configured to drive second barrel cam 204 shown by FIG. 2, the motor configured to drive second barrel cam 502 described above with reference to FIGS. 5A-5F, etc.), plot 814 shows a rotational position of the first barrel cam (e.g., similar to the positions shown by FIGS. 5A-5E), and plot 816 shows a rotational position of the second barrel cam (e.g., similar to the positions shown by FIGS. 5A-5E).

It should be appreciated that the energization of the first and second actuator motors in graph 800 may be in a positive direction (e.g., corresponding to a first polarity, or forward polarity, as described above) or in a negative direction (e.g., corresponding to an opposite, second polarity, or reverse polarity, as described above), as shown in plots 810 and 812, respectively. For example, at time t3, the first and second motors are energized in a positive direction, while at t4, both the first motor and the second motor are energized in a negative direction. As the energization of the motors results in the rotation of the corresponding barrels, positive energization results in a rotation of the corresponding barrel in one direction, while negative energization results in a rotation of the corresponding barrel in the opposite direction. For example, in one embodiment, a positive energization of the first motor may result in a clockwise rotation of the first barrel (e.g.,) 120°, while a negative energization of the first motor may result in a counterclockwise rotation of the first barrel (e.g., 120° in the opposite direction). In another embodiment, a positive energization of the first motor may result in a counterclockwise rotation of the first barrel, while a negative energization of the first motor may result in a clockwise rotation of the first barrel. In the description below, the direction of the rotation of the barrel is not described, as the rotation of the barrel may occur in either direction without departing from the scope of this disclosure.

At time t0, the engine of the vehicle is off, and air and fuel are not combusted within the engine cylinders, as indicated by plot 802. The vehicle is stationary, as shown by plot 806, and the accelerator pedal is not engaged by a driver, as shown in plot 804. The first motor and the second motor are not energized, as shown by plots 810 and 812, and consequently the first barrel and second barrel are both at an initial rotational position corresponding to neutral, as shown by plots 814 and 816, respectively, meaning that no gears of the transmission are engaged (as shown by plot 808).

At time t1, the driver initiates operation of the vehicle by starting the engine and engaging the first gear of the transmission. In order to engage the first gear of the transmission, the first motor is positively energized, as shown at t1 by plot 810. The positive energization of the first motor causes the first barrel to rotate in a first direction to a rotational position corresponding to the first gear of the transmission, as shown by plot 814. The second motor is not energized, meaning that the rotational position of the second barrel is not adjusted, as shown by plot 812 and 816, respectively. As the first barrel rotates into a rotational position corresponding to first gear, a following pin of a first shift fork (e.g., the following pin 246 of the shift fork 222 of FIGS. 2 and 4) moves along the cam track of the first barrel (e.g., cam track 228 of first barrel cam 202 of FIG. 2), which in turn causes the first shift fork to slide along a gear selector shaft (e.g., the gear selector shaft 232 of shift assembly 200 of FIG. 2) in order to engage the first gear of the transmission, as described in detail above in relation to FIGS. 2 and 4. The engagement of the first gear of the transmission is indicated on graph 800 by plot 808.

Between t1 and t2, the driver adjusts the accelerator pedal position (e.g., by applying downward pressure on the accelerator pedal) and engine speed and vehicle speed both increase, as shown by plots 802 and 806, respectively, responsive to the change in accelerator pedal position (e.g., as the accelerator pedal is adjusted by a driver) as shown by plot 804. Once the vehicle is in gear, the first motor and the second motor are not energized, as shown by plots 810 and 812, respectively, and the rotational positions of the first barrel and second barrel remain in their positions established at t1.

In plot 804, accelerator pedal position is shown as increasing as the vehicle accelerates. For example, an accelerator pedal position of 0 on the graph may indicate that no pressure is applied to the accelerator pedal, a positive change (e.g., an increase) in the accelerator pedal position may indicate that the vehicle is experiencing positive acceleration, and a negative change (e.g., a decrease) in the accelerator pedal position may indicate that the vehicle is experiencing negative acceleration. Between t1 and t2, a positive change in accelerator pedal position is shown in plot 804, meaning that the vehicle is experiencing positive acceleration, where vehicle speed and engine speed are both shown as increasing in plots 806 and 802, respectively.

At t2 a shift condition is met for engaging the second gear of the transmission. As described above in relation to FIGS. 6 and 7, the shift condition may be determined by a combination of factors, such as vehicle speed passing a threshold value, engine speed passing a threshold value, positive acceleration as indicated by accelerator pedal position, etc. Example thresholds for vehicle speed are described in further detail below in reference to FIG. 9.

When the shift condition is met for engaging the second gear of the transmission at t2, the first motor is positively energized, as shown by plot 810, which causes the first barrel to be adjusted to a rotational position corresponding to the second gear of the transmission, as shown by plot 814. The second motor is not energized and the second barrel remains in a rotational position corresponding to neutral, as shown by plots 812 and 816, respectively. As the first barrel rotates into a rotational position corresponding to second gear, the following pin of the first shift fork (e.g., the following pin 246 of the shift fork 222 of FIGS. 2 and 4) moves along the cam track of the first barrel (e.g., cam track 228 of first barrel cam 202 of FIG. 2), which in turn causes the first shift fork to slide along the gear selector shaft to engage the second gear of the transmission. The engagement of the second gear of the transmission is indicated by plot 808.

As the second gear of the transmission is engaged, between t2 and t3 the engine speed initially decreases, as shown by plot 802, and then begins to increase responsive to the change in accelerator pedal position (e.g., as the driver accelerates), as shown by plot 804. The vehicle speed also continues to increase responsive to the accelerator pedal position, as shown by plot 806.

At t3, a shift condition is met for engaging the third gear of the transmission. When the shift condition is met for engaging the third gear of the transmission, the first motor is positively energized as shown by plot 810, which causes the first barrel to be adjusted to a rotational position corresponding to neutral, as shown by plot 814. As the first barrel rotates into a rotational position corresponding to neutral, the following pin of the first shift fork slides along the cam track of the first barrel, which in turn causes the first shift fork to slide along the gear selector shaft in order to disengage the second gear of the transmission. Once the second gear of the transmission has been disengaged, the second motor is positively energized, causing the second barrel to rotate into a rotational position corresponding to third gear, as shown by plot 816. As the second barrel rotates into a rotational position corresponding to third gear, a following pin of a second shift fork (e.g., the following pin 248 of the shift fork 224 of FIGS. 2 and 4) slides along the cam track of the second barrel (e.g., cam track 230 of barrel 20 of FIG. 2), which in turn causes the second shift fork to slide along the gear selector shaft to engage the third gear of the transmission. The engagement of the third gear of the transmission at t3 is indicated by plot 808.

As the third gear of the transmission is engaged, between t3 and t4 the engine speed initially decreases, as shown by plot 802, and then remains generally constant as the accelerator pedal position indicates a negative acceleration (e.g. deceleration by the driver), as shown by plot 804. Accordingly, the vehicle speed initially increases responsive to an accelerator pedal position corresponding to a positive acceleration, as shown by plot 806, and then begins to decrease responsive to an accelerator pedal position corresponding to a negative acceleration.

As the vehicle speed decreases between t3 and t4, at t4 a shift condition is met for disengaging the third gear of the transmission and engaging the second gear of the transmission (e.g., downshifting). When the shift condition is met for downshifting from the third gear of the transmission to the second gear of the transmission, the second motor is negatively energized as shown by plot 810, which causes the second barrel to be adjusted in the reverse direction to a rotational position corresponding to neutral, as shown by plot 814. As the second barrel rotates into the rotational position corresponding to neutral, the following pin of the second shift fork slides back along the cam track of the second barrel in the reverse direction, which in turn causes the second shift fork to slide along the gear selector shaft in order to disengage the third gear of the transmission. When the third gear of the transmission is disengaged, the first motor is then negatively energized, causing the first barrel to rotate in the reverse direction into a rotational position corresponding to neutral, as shown by plot 816. As the first barrel rotates the opposite direction into a rotational position corresponding to second gear, the following pin of the first shift fork slides back along the cam track of the first barrel, which in turn causes the first shift fork to slide along the gear selector shaft to engage the second gear of the transmission. The engagement of the second gear of the transmission at t4 is indicated by plot 808.

When the second gear of the transmission is engaged at t4, between t4 and t5 the engine speed initially increases, as shown by plot 802, and then decreases as the vehicle speed decreases, as shown in plot 806. Shortly prior to t5 the vehicle once again accelerates, as shown by the change in accelerator pedal position in plot 804. As the vehicle accelerates, the vehicle speed and engine speed both increase responsive to the accelerator pedal position as shown in plots 802 and 806, respectively.

At time t5, a shift condition is met for engaging the third gear of the transmission. The third gear is engaged via the sequence of steps indicated above in reference to time t3, as shown by the energization of the first motor and second motor at t5 in plots 810 and 812, respectively, and the corresponding rotation of the first barrel into a neutral position and the rotation of the second barrel into third gear as shown by plots 814 and 816, respectively.

It should be appreciated that at time t5, gear phasing occurs during the disengagement of the second gear and engagement of the third gear, as shown in box 818. As described in detail above in reference to FIGS. 2-7, the energization of the second motor at t5 (as shown by plot 810) overlaps with the energization of the first motor at t5 (as shown by plot 812), such that the second barrel is rotated into a rotational position for third gear (as shown by plot 816) slightly before the first barrel fully completes its rotation into the neutral position (as shown by plot 814). As stated earlier, this gear phasing may increase shift efficiency, thus increasing fuel efficiency and decreasing wear on components of the transmission.

Between times t5 and t6, plot 804 indicates a negative change in the accelerator pedal position (e.g., a deceleration). Accordingly, between times t5 and t6, the vehicle speed and engine speed decrease, as shown by plots 806 and 802, respectively.

At time t6, a shift condition is met for disengaging the third gear of the transmission and engaging the second gear of the transmission. Accordingly, the vehicle downshifts from third gear into second gear according to the procedure described above in relation to time t4, which is indicated by the negative energization of the second motor at t6 as shown in plot 812, followed by the negative energization of the first motor as shown in plot 810. Likewise, the rotation of the second barrel into the rotational position for neutral in shown in plot 816, and the subsequent rotation of the first barrel into the rotational position for the second gear of the transmission is shown by plot 814.

Between times t6 and t7, plot 804 continues to indicate a negative change in the accelerator pedal position (e.g., meaning that the driver is decreasing pressure on the accelerator in order to decelerate the vehicle). Accordingly, between times t6 and t7 the vehicle speed and engine speed decrease, as shown by plots 806 and 802, respectively.

At time t7, a shift condition is met for disengaging the second gear of the transmission and engaging the first gear of the transmission. Accordingly, the vehicle downshifts from second gear into first gear. The first motor is negatively energized as shown by plot 810, which causes the first barrel to be adjusted to a rotational position corresponding to first gear, as shown by plot 814. The second motor is not energized, and the second barrel remains in a rotational position corresponding to neutral, as shown by plots 812 and 816, respectively. As the first barrel rotates into a rotational position corresponding to first gear, the first shift fork slides along the gear selector shaft to engage the first gear of the transmission, in accordance with the operation of the barrel cam actuator as described above. The engagement of the first gear of the transmission at t7 is indicated by plot 808.

Between times t7 and t8, the driver accelerates, as shown by the plot 804 which indicates that the accelerator pedal position in changing in a positive direction. The corresponding increase in vehicle and engine speed prior to t8 is rapid, as shown by plots 806 and 802, respectively. In accordance with the rapid acceleration indicated by increase in vehicle and engine speed, at t8 a shift condition is met for disengaging the first gear of the transmission and engaging the third gear of the transmission, thus skipping the engagement of the second gear of the transmission, as shown by plot 808. As discussed above in reference to FIGS. 2-7, gear skipping may increase shift efficiency in some shift conditions.

In order to shift into the third gear of the transmission from the first gear of the transmission, the first motor is energized in a negative direction as indicated by plot 810, which causes the first barrel to rotate into the position for neutral, as indicated by plot 814. As the first barrel rotates into the neutral position, the first shift fork slides along the gear selector shaft to disengage the first gear of the transmission in accordance with the movement of the first shift fork's following pin in the cam track of the first barrel, as described above. When the first gear is disengaged by the first shift fork, the second motor energizes in a positive direction as shown by plot 812, rotating the second barrel into the rotational position for the third gear of the transmission, as shown by plot 816. As the second barrel rotates into the position for third gear, the second shift fork engages the third gear of the transmission as result of the action of the second shift fork's following pin on the cam track of the second barrel, as described above.

Between t8 and t9, the engine speed decreases rapidly as the engine adjusts to the engagement of the higher gear as shown by plot 802, while the vehicle speed remains generally constant as shown by plot 806. Approaching time t9, the accelerator pedal position in plot 804 indicates a deceleration of the vehicle, and at t9, the second motor is energized in a negative direction as shown in plot 812, which results in the rotation of the second barrel into the rotational position for neutral as shown by plot 816, and the corresponding disengagement of the third gear of the transmission via the second shift fork according to the procedure described above. Once the third gear of the transmission has been disengaged, the first motor is energized as shown in plot 810, and the first barrel is rotated into the position corresponding to the second gear of the transmission, as shown in plot 814, and the second gear of the transmission is engaged via the first shift fork, according to the procedure described above. The engagement of second gear at time t9 is indicated by plot 808.

Between time t9 and t10, the engine speed initially increases and then decreases as the engine adjusts to the lower gear ratio, and then the vehicle accelerates slightly as shown by the accelerator pedal position plot 804, and the vehicle speed and engine speed increase as shown by plots 806 and 802, respectively. At t10, a shift condition is met for engaging the third gear of the transmission. When the shift condition is met for engaging the third gear of the transmission, the first motor is positively energized as shown by plot 810, which causes the first barrel to be adjusted to a rotational position corresponding to neutral, as shown by plot 814, which in turn causes the first shift fork to slide along the gear selector shaft in order to disengage the second gear of the transmission. Once the second gear of the transmission has been disengaged, the second motor is positively energized, causing the second barrel to rotate into a rotational position corresponding to third gear, as shown by plot 816, which in turn causes the second shift fork to slide along the gear selector shaft to engage the third gear of the transmission. The engagement of the third gear of the transmission at t3 is indicated by plot 808.

Between time t10 and t11, the vehicle accelerates slightly and then rapidly decelerates as shown by the accelerator pedal position plot 804, with a corresponding rapid decrease in the vehicle speed and engine speed as shown by plots 806 and 802, respectively. At t11, a shift condition is met for disengaging from the third gear of the transmission and engaging the first gear of the transmission, skipping the engagement of the second gear of the transmission. The procedure for downshifting from the third gear of the transmission directly into first gear of the transmission without engaging the second gear of the transmission is the reverse of the procedure mentioned above for shifting from the first gear of the transmission directly into the third gear of the transmission without engaging the second gear of the transmission. The second motor is energized in a negative direction as shown by plot 812, in order to rotate the second barrel into the rotational position for neutral as shown by plot 816, thus disengaging the third gear, and the first motor is consequently energized in a positive direction as shown by plot 810, in order to rotate the first barrel into the rotational position for first gear as shown by plot 814, thus engaging the first gear of the transmission.

Between time t11 and t12, plot 804 indicates that the accelerator pedal position returns to its initial state, e.g., that no pressure is applied to the accelerator pedal by the driver. Plot 806 shows that the engine speed decreases to zero, indicating that the vehicle is stationary. Plot 802 indicates that the engine speed decreases but does not drop to zero, indicating that the vehicle is idling in neutral (e.g., with no gears engaged) when time t12 is reached. At time t12, the first motor is energized in a negative direction as shown by plot 810, rotating the first barrel from the rotational position corresponding to first gear to the rotational position corresponding to neutral as shown by plot 814, thus disengaging from the first gear of the transmission as shown by plot 808, and the engine is turned off.

At time t13, the accelerator pedal position, vehicle speed, and engine speed are at zero as indicated by plots 804, 806, and 802, respectively, and the vehicle is parked by engaging the first and third gears of the transmission simultaneously. The first motor is energized in a positive direction as shown by plot 810, which rotates the first barrel from a neutral position into the rotational position for first gear, as shown by plot 814. Concurrently, the second motor is energized, as shown by plot 812, which rotates the second barrel into the rotational position for third gear, as shown by plot 816. Both the first gear and the third gear of the transmission are shown as engaged at 808, indicating that the vehicle transmission is in a parked state, whereby no rotation of the output shaft (e.g., output shaft 428 of FIG. 4) is permitted, and the drive wheels (e.g. drive wheels 122 and 120 of FIG. 1) are prevented from moving.

Referring now to FIG. 9, a graph 900 is shown including various plots illustrating a shift schedule of a vehicle including a transmission and a shift assembly according to the examples described above. Components described herein with reference to FIG. 9 may be similar to the components described above. For example, the vehicle, transmission, and shift assembly may be similar to, or the same as, the vehicle 100, transmission 104, and shift assembly 112 described above with reference to FIG. 1. The shift assembly may adjust the gear engagement of the transmission, similar to the examples described above with reference to FIGS. 2-4, FIGS. 5A-5E, and FIGS. 6-7. Operation of the shift assembly is controlled by a controller, similar to the controllers described above (e.g., electronic controller 110 shown by FIG. 1 and described above).

Graph 900 shows vehicle speed along the horizontal axis and accelerator pedal position along the vertical axis. The accelerator pedal position may correspond to a commanded torque output of the vehicle (e.g., a commanded torque output of the engine and/or electric motor configured to provide torque to propel the vehicle). Plot 904 indicates the relationship between vehicle speed and accelerator pedal position that results in a shift condition of shifting from engagement of the first gear of the transmission to engagement of the second gear of the transmission (e.g., upshifting from first gear). In particular, for a given accelerator pedal position, plot 904 illustrates a threshold vehicle speed at which the controller commands the shift assembly to adjust (e.g., transition) the gear engagement of the transmission from first gear to second gear. Similarly, plot 908 indicates the relationship between vehicle speed and accelerator pedal position that results in a shift condition of shifting from engagement of the second gear of the transmission to engagement of the third gear of the transmission. For a given accelerator pedal position, plot 908 illustrates a threshold vehicle speed at which the controller commands the shift assembly to adjust the gear engagement of the transmission from second gear to third gear.

Plot 902 indicates the relationship between vehicle speed and accelerator pedal position that results in a shift condition of shifting from engagement of the second gear of the transmission to engagement of the first gear of the transmission (e.g., downshifting from second gear). In particular, for a given accelerator pedal position, plot 902 illustrates a threshold vehicle speed at which the controller commands the shift assembly to adjust (e.g., transition) the gear engagement of the transmission from second gear to first gear. Similarly, plot 906 indicates the relationship between vehicle speed and accelerator pedal position that results in a shift condition of shifting from engagement of the third gear of the transmission to engagement of the second gear of the transmission. For a given accelerator pedal position, plot 906 illustrates a threshold vehicle speed at which the controller commands the shift assembly to adjust the gear engagement of the transmission from third gear to second gear. Plot 902 is plotted at a lower vehicle speed than plot 904 and, as stated above, downshifting from second gear into first gear and upshifting from first gear into second gear may occur at different vehicle speeds. This may reduce a likelihood that a controller of the vehicle (e.g., the electronic controller 110 of FIG. 1) determines alternating shift up conditions and shift down conditions as vehicle speed is maintained at or around a single threshold for shifting up or shifting down.

Graph 900 additionally includes a first marker 910, second marker 912, third marker 914, fourth marker 916, fifth marker 918, sixth marker 920, and seventh marker 922. The various markers are shown to indicate operating conditions of the vehicle in which the transmission is commanded to shift directly from first gear to third gear, or vice versa. For example, during some conditions, the controller may command the shift assembly of the vehicle to shift out of the gear sequence of the transmission by disengaging the first gear of the transmission and engaging the third gear of the transmission, without engaging the second gear of the transmission during the transition from engagement of the first gear to engagement of the third gear.

As one example, the vehicle may be operating at a relatively low vehicle speed and a relatively high amount of throttle opening (e.g., a relatively high engine load corresponding to a large amount of accelerator pedal depression) with the first gear of the transmission engaged, as indicated by the first marker 910. The vehicle speed may increase to the amount indicated by the second marker 912. However, if the vehicle is operating with the vehicle speed and accelerator pedal position indicated by second marker 912 and the accelerator pedal is then quickly released (e.g., the driver of the vehicle stops pressing the accelerator pedal), the controller determine that a rate of change of the commanded torque output is greater than a threshold rate of change, and as a result, the controller may command the shift assembly to transition directly from engagement of the first gear to engagement of the third gear. For example, the vehicle condition may transition from the condition indicated by second marker 912 (e.g., in which the vehicle is operated with the first gear engaged) to the condition indicated by the sixth marker 920 (e.g., in which the vehicle is operated with the third gear engaged), without transitioning from engagement of the first gear to engagement of the third gear. As another example, the controller may command the shift assembly to transition directly from engagement of the first gear to engagement of the third gear during conditions in which the vehicle is operating in a fuel economy mode with a relatively large amount of accelerator pedal position (e.g., the controller may determine that a rate of change of the vehicle speed is greater than a threshold rate of change). For example, the operating condition of the vehicle may transition from the condition shown by first marker 910 to the condition shown by fourth marker 916, where the first gear is engaged in the condition indicated by first marker 910 and the third gear is engaged in the condition shown by fourth marker 916. The transition from the condition shown by first marker 910 to the condition shown by fourth marker 916 occurs without engagement of the second gear of the transmission.

During some conditions, the controller may command the shift assembly to shift directly from third gear to first gear, without engaging the second gear of the transmission during the transition. For example, the vehicle may transition from operating in the condition indicated by sixth marker 920 to the condition indicated by third marker 914, where the third gear of the transmission is engaged while in the condition indicated by the sixth marker 920, and the first gear of the transmission is engaged while in the condition indicated by the third marker 914. The transition from the condition indicated by the sixth marker 920 to the condition indicated by the third marker 914 may occur responsive to a relatively sudden increase in accelerator pedal depression (e.g., a large increase in the amount of throttle opening, where the controller determines that a rate of change of the commanded torque output is greater than a threshold rate of change). As another example, the vehicle may transition from operating in the condition indicated by seventh marker 922 to the condition indicated by fifth marker 918, where the third gear of the transmission is engaged while in the condition indicated by the seventh marker 922, and the first gear of the transmission is engaged while in the condition indicated by the fifth marker 918. The transition from operating in the condition indicated by the seventh marker 922 to the condition indicated by the fifth marker 918 may occur without engagement of the second gear, and may occur responsive to a relatively quick stopping of the vehicle (e.g., decreasing the speed of the vehicle quickly from the amount indicated by the seventh marker 922 to the amount indicated by the fifth marker 918, with the controller determining that a rate of change of the vehicle speed is greater than a threshold rate of change). Other examples are possible.

The controller may adjust the rotation timing of the first barrel cam and the rotation timing of the second barrel cam based on the accelerator pedal position (e.g., the commanded torque output of the vehicle) and the vehicle speed according to the examples described above with reference to graph 900 (e.g., the controller may adjust the rotation timing of the first barrel cam and/or the rotation timing of the second barrel cam to disengage the first gear and shift directly to engagement of the second gear or third gear, to disengage the third gear and shift directly to engagement of the second gear or first gear, to engage both of the first gear and third gear for parking of the vehicle, etc.).

Further, in some examples, the controller may adjust the rotation timing of the first barrel cam and the rotation timing of the second barrel cam to provide a commanded duration (e.g., commanded transition duration) between disengagement of one gear (e.g., the second gear in the gear sequence of the transmission) and engagement of another gear (e.g., the third gear in the gear sequence of the transmission), where the commanded duration may be a function of vehicle speed and/or accelerator pedal position (e.g., the commanded torque output of the vehicle).

As one example, while transitioning from engagement of the second gear to engagement of the third gear at a lower, first vehicle speed and a first accelerator pedal position (e.g., during conditions indicated by marker 921), the controller may adjust the relative rotation timing of the first barrel cam and second barrel cam to provide a first commanded duration between disengagement of the second gear and engagement of the third gear. However, while transitioning from engagement of the second gear to engagement of the third gear at the same, first vehicle speed and a second accelerator pedal position (e.g., during conditions indicated by marker 923), the controller may adjust the relative rotation timing of the first barrel cam and second barrel cam to provide a second commanded duration between disengagement of the second gear and engagement of the third gear, where the second commanded duration may be different than the first commanded duration (e.g., a shorter amount of time relative to the first commanded duration). Further still, while transitioning from engagement of the second gear to engagement of the third gear at a higher, second vehicle speed and a third accelerator pedal position (e.g., during conditions indicated by marker 925), the controller may adjust the relative rotation timing of the first barrel cam and second barrel cam to provide a third commanded duration between disengagement of the second gear and engagement of the third gear, where the third commanded duration may be different than the first commanded duration and/or second commanded duration (e.g., a shorter amount of time relative to the first commanded duration and/or second commanded duration). Although the transition from engagement of second gear to engagement of third gear is described above as an example, the controller may adjust the relative rotation timing of the first barrel cam and second barrel cam responsive to other gear engagement transitions (e.g., while transitioning from engagement of the first gear to engagement of the second gear or vice versa, while transitioning from engagement of the first gear directly to engagement of the third gear or vice versa, etc.)

According to the examples described above, the controller may adjust the relative rotation timing of the first barrel cam and the second barrel cam based on the vehicle speed and/or accelerator pedal position. For example, the relative rotation timing of the first barrel cam and the second barrel cam may be a function of vehicle speed, accelerator pedal position (e.g., commanded torque output of the vehicle), and the gear engagement configuration of the transmission (e.g., the configuration in which the first gear is engaged, the configuration in which the second gear is engaged, etc.). Providing the different commanded durations may increase a responsiveness of the shift assembly and transmission and/or reduce a likelihood of degradation of components of the shift assembly and transmission (e.g., reduce a likelihood of wear of the first barrel cam and/or second barrel cam), and other examples are possible.

Further, the plots illustrated by graph 900 (e.g., plot 902, plot 904, plot 906, and plot 908) are provided as non-limiting examples. The controller controls the shift timing by controlling the rotation timing of the first barrel cam and controlling the rotation of the second barrel cam, and in some examples the controller may adjust the shift timing to be different from the examples shown by FIG. 9. As one example, the controller may adjust the shift timing by adjusting the rotation timing of the first barrel cam to control the vehicle speed and/or accelerator pedal position at which the transmission shifts from engagement of the first gear to engagement of the second gear (illustrated by plot 904). An example adjustment to the shift timing is illustrated by plot 905, where plot 905 is shifted leftward along graph 900 relative to plot 904 but includes the same contour as plot 904. Plot 905 represents an alternative plot of vehicle speed and accelerator pedal position associated with shifting from engagement of the first gear to engagement of the second gear. For example, the shift timing may utilize the relationship illustrated by plot 905 rather than the relationship illustrator by plot 904 responsive to selection of a different operating mode (e.g., a different performance mode) of the vehicle by an operator of the vehicle (e.g., a driver). While controlling the shift timing according to the vehicle speed and accelerator pedal position relationship illustrated by plot 905, the rotation timing of the first barrel cam is advanced relative to the rotation timing of the first barrel cam while controlling the shift timing according to the relationship illustrated by plot 904. Although plot 904 and plot 905 are described above as one example, other examples are possible.

In the example described above, adjusting the shift timing is achieved by adjusting only the rotation timing of the first barrel cam, because the engagement of the first gear of the transmission and the engagement of the second gear of the transmission are each controlled by only the first barrel cam and not the second barrel cam. The transmission may transition directly between engagement of the first gear and engagement of the second gear with the adjusted shift timing (e.g., the shift timing utilizing the adjusted rotation timing of the first barrel cam). In particular, adjusting the shift timing to advance the transition between engagement of the first gear and engagement of the second gear (e.g., by advancing the rotation timing of the first barrel cam) may result in the controller determining that a shift condition is present at lower vehicle speeds (e.g., a threshold speed corresponding to initiation of the transition may be lowered) and/or less accelerator pedal depression amounts, while adjusting the shift timing to retard the transition between engagement of the first gear and engagement of the second gear (e.g., by retarding the rotation timing of the first barrel cam) may result in the controller determining that a shift condition is present at higher vehicle speeds (e.g., the threshold speed corresponding to initiation of the transition may be increased) and/or greater accelerator pedal depression amounts. For example, the shift timing may be adjusted by adjusting the rotation timing of only the first barrel cam so that the transmission initiates the transition from engagement of the first gear to engagement of the second gear during conditions represented by locations along plot 905 instead of conditions represented by locations along plot 904.

As another example, adjusting the shift timing may be achieved by concurrently adjusting each of the rotation timing of the first barrel cam and the rotation timing of the second barrel cam. For example, while adjusting from engagement of the first gear or second gear of the transmission to engagement of the third gear of the transmission, both of the first barrel cam and the second barrel cam may be rotated (e.g., in order to disengage the first gear or the second gear and to engage the third gear). The transmission may transition directly between engagement of the first gear or second gear and engagement of the third gear with the adjusted shift timing (e.g., the shift timing utilizing the adjusted rotation timing of the first barrel cam and the adjusted rotation timing of the second barrel cam). Adjusting the shift timing to advance the transition between engagement of the first gear or the second gear and engagement of the third gear (e.g., by advancing the rotation timing of each of the first barrel cam and the second barrel cam) may result in the controller determining that a shift condition is present at lower vehicle speeds (e.g., a threshold speed corresponding to initiation of the transition may be lowered) and/or less accelerator pedal depression amounts, while adjusting the shift timing to retard the transition between engagement of the first gear or second gear and the engagement of the third gear (e.g., by retarding the rotation timing of each of the first barrel cam and the second barrel cam) may result in the controller determining that a shift condition is present at higher vehicle speeds (e.g., the threshold speed corresponding to initiation of the transition may be increased) and/or greater accelerator pedal depression amounts. For example, as described above, the shift timing may be adjusted by adjusting each of the rotation timing of the first barrel cam and the rotation timing of the second barrel cam so that the transmission initiates the transition from engagement of the first gear or second gear to engagement of the third gear during conditions represented by locations along plot 909 instead of conditions represented by locations along plot 908.

Further, in some examples, the shift timing may be adjusted by adjusting the rotation timing of the first barrel cam and the rotation timing of the second barrel cam, and, responsive to a condition such as a rate of change of the commanded torque output exceeding a threshold rate of change or a rate of change of the vehicle speed exceeding a threshold rate of change, the transmission may transition between engagement of the first gear or the second gear directly to engagement of the third gear (or vice versa) with the adjusted rotation timing. As one example, the vehicle may transition from the condition indicated by the sixth marker 920 to the condition indicated by the third marker 914 as described above (e.g., responsive to the rate of change of the commanded torque output exceeding the threshold rate of change), or the vehicle may be operating with the vehicle speed and accelerator pedal position indicated by second marker 912 and the accelerator pedal is then quickly released (e.g., the driver of the vehicle stops pressing the accelerator pedal, with the rate of change of the commanded torque output exceeding the threshold rate of change). As another example, the vehicle may be operating in the fuel economy mode with a relatively large amount of accelerator pedal position as described above (e.g., with the controller determining that a rate of change of the vehicle speed is greater than the threshold rate of change), or the vehicle speed may decrease quickly from the amount indicated by the seventh marker 922 to the amount indicated by the fifth marker 918 as described above (e.g., with the controller determining that a rate of change of the vehicle speed is greater than the threshold rate of change). Other examples are possible.

In this way, the inclusion of a split-barrel cam with two independently operated, coaxially aligned barrel cams in a shift assembly of an automated manual transmission, as described herein, may result in a number of advantages over a single barrel cam. In particular, shift efficiency may be increased by employing gear phasing or gear skipping, as described above, which in turn may increase fuel efficiency, reduce wear on parts, and improve shift performance from the point of view of an operator. Shift efficiency may also be adjusted dynamically or over the lifetime of a transmission, such that shift efficiency is maintained as operating conditions change or components experience wear. Additionally, the independent operation of two small barrel cams in the arrangement described herein, as opposed to a single large barrel cam, may lead to reductions in the size of the actuator motors that rotate the barrels and/or the amount of power used to rotate the barrels. Further, the independent operation of separate barrel cams may provide for multiple gears of a transmission to be engaged concurrently, to provide a transmission locking functionality that may serve as an additional parking mechanism.

An embodiment relates to a system including a shift assembly for a transmission, comprising: a first barrel cam including a first cam track; a second barrel cam arranged coaxially with the first barrel cam and including a second cam track; a first motor configured to drive the first barrel cam independent of the second barrel cam; and a second motor configured to drive the second barrel cam independent of the first barrel cam. In a first example of the system, the first barrel cam is supported within a housing of the shift assembly by a first bearing, the second barrel cam is supported within the housing by a second bearing, and the first bearing, the second bearing, the first barrel cam, and the second barrel cam are arranged along a common axis, and wherein the common axis is a rotational axis of the first barrel cam and the second barrel cam. In a second example of the system, which optionally includes the first example, the shift assembly includes a bushing arranged between the first barrel cam and the second barrel cam, the first barrel cam and second barrel cam coupled by the bushing and rotatable independent of each other via the bushing. In a third example of the system, which optionally includes one or both of the first and second examples, the first barrel cam is coupled to the first motor by a first gear assembly arranged at a first side of the bushing, and the second barrel cam is coupled to the second motor by a second gear assembly arranged at an opposing, second side of the bushing. In a fourth example of the system, which optionally includes one or more or each of the first through third examples, the shift assembly further includes a first shift fork including a first following pin seated within the first cam track, and a second shift fork including a second following pin seated within the second cam track. In a fifth example of the system, which optionally includes one or more or each of the first through fourth examples, the first following pin is slideable within the first cam track to a first position and a second position, where, while the first following pin is in the first position, the first shift fork is in a first gear engagement position, and while the first following pin is in the second position, the first shift fork is in a second gear engagement position. In a sixth example of the system, which optionally includes one or more or each of the first through fifth examples, the second following pin is slideable within the second cam track to a third position, where, while the second following pin is in the third position, the second shift fork is in a third gear engagement position. In a seventh example of the system, which optionally includes one or more or each of the first through sixth examples, the first barrel cam is rotatable via the first motor in a first direction and an opposing, second direction, and the second barrel cam is rotatable via the second motor in the first direction and the opposing, second direction independent of the first barrel cam.

An embodiment is directed to a method including controlling a rotational position of a first barrel cam of a shift assembly of a transmission around a rotational axis via a first motor; and controlling a rotational position of a second barrel cam of the shift assembly around the rotational axis via a second motor, independent of the rotational position of the first barrel cam. In a first example of the method, controlling the rotational position of the first barrel cam around the rotational axis includes energizing the first motor to rotate the first barrel cam in a first direction or an opposing, second direction, and controlling the rotational position of the second barrel cam around the rotational axis includes energizing the second motor to rotate the second barrel cam in the first direction or the opposing, second direction. In a second example of the method, which optionally includes the first example, controlling the rotational position of the first barrel cam includes controlling the rotational position of the first barrel cam to a first position to engage a first gear of the transmission and controlling the rotational position of the first barrel cam to a second position to engage a second gear of the transmission. In a third example of the method, which optionally includes one or both of the first and second examples, controlling the rotational position of the second barrel cam includes controlling the rotational position of the second barrel cam to a third position to engage a third gear of the transmission. In a fourth example of the method, which optionally includes one or more or each of the first through third examples, the method includes, during a first condition, controlling the rotational position of the first barrel cam from the first position to the second position to disengage the first gear and engage the second gear, while the rotational position of the second barrel cam remains in a second neutral position; and during a second condition, controlling the rotational position of the first barrel cam from the first position to the first neutral position and controlling the rotational position of the second barrel cam from the second neutral position to the third position to disengage the first gear and engage the third gear, without engaging the second gear there between. In a fifth example of the method, which optionally includes one or more or each of the first through fourth examples, the method further includes, prior to or during the controlling of the rotational position of the second barrel cam to the third position to engage the third gear of the transmission, controlling the rotational position of the first barrel cam to a first neutral position to disengage the first gear or the second gear, wherein the energization of the first motor to control the rotational position of the first barrel cam to the first neutral position and the energization of the second motor to control the rotational position of the second barrel cam to the third position are timed to commence engagement of the third gear before the first or second gear is fully disengaged. In a sixth example of the method, which optionally includes one or more or each of the first through fifth examples, the vehicle is stationary and controlling the rotational position of the first barrel cam includes controlling the rotational position of the first barrel cam to the first position to engage the first gear of the transmission, and controlling the rotational position of the second barrel cam includes controlling the rotational position of the second barrel cam to the third position to engage the third gear of the transmission concurrently with the controlling of the rotational position of the first barrel cam.

An embodiment of a transmission for a vehicle includes a first barrel cam including a first cam track; a second barrel cam arranged coaxially with the first barrel cam and including a second cam track; a first motor configured to drive the first barrel cam; a second motor configured to drive the second barrel cam independent of the first barrel cam; a first shift fork including a first following pin seated within the first cam track; a second shift fork including a second following pin seated within the second cam track; a transmission input shaft including a first gear, a second gear, and a third gear; and a controller with computer readable instructions stored on non-transitory memory that when executed, cause the controller to: responsive to a first command, energize the first motor to adjust a rotational position of the first barrel cam from a first position to a second position, thereby moving the first following pin and shifting a lateral position of the first shift fork to disengage the first gear and engage the second gear; and responsive to a second command, energize the second motor to adjust a rotational position of the second barrel cam to a third position, thereby moving the second following pin and shifting a lateral position of the second shift fork to engage the third gear. In a first example of the transmission, the second barrel cam moves from a second neutral position to the third position responsive to the second command, wherein the second barrel cam remains in the second neutral position responsive to the first command, and wherein the instructions further cause the controller to, responsive to the second command, energize the first motor to adjust the rotational position of the first barrel cam to a first neutral position where the second gear is disengaged. In a second example of the transmission, which optionally includes the first example, the first motor is energized to rotate the first barrel cam in a first direction responsive to the first command and the first motor is energized to rotate the first barrel cam in a second, opposing direction responsive to the second command. In a third example of the transmission, which optionally includes one or both of the first and second examples, a timing of the energization of the first motor and the energization of the second motor responsive to the second command is controlled to commence engagement of the third gear before the second gear is fully disengaged. In a fourth example of the transmission, which optionally includes one or more or each of the first through third examples, the instructions further cause the controller to, responsive to a third command: energize the first motor to adjust the rotational position of the first barrel cam from the first position to the first neutral position, thereby moving the first following pin and shifting the lateral position of the first shift fork to disengage the first gear; and energize the second motor to adjust the rotational position of the second barrel cam to the third position, thereby moving the second following pin and shifting the lateral position of the second shift fork to engage the third gear.

The technical effect of including an actuator with a split-barrel cam in a shift assembly of an automated manual transmission as described herein is that shift efficiency and fuel efficiency may be increased via the independent operation of the two barrels of the split-barrel cam, leading to reduced wear in actuator components. Further, the independent operation of the two barrels of the split-barrel cam may result in additional benefits, such as reducing the dimensions of the shift assembly and/or reducing the amount of power used to actuate the gears of the shift assembly.

FIGS. 2-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example.

In another representation, a method for a transmission of a vehicle includes responsive to a first condition, controlling a rotational position of a first barrel cam of the transmission from a first position to a second position to disengage a first gear of the transmission and engage a second gear of the transmission, while a rotational position of a second barrel cam of the transmission remains in a second neutral position; responsive to a second condition, controlling the rotational position of the first barrel cam from the first position to a first neutral position to disengage the first gear and controlling the rotational position of the second barrel cam from the second neutral position to a third position to engage a third gear of the transmission, without engaging the second gear there between, where the controlling of the rotational position of the second barrel cam to the third position is initiated before the first gear is fully disengaged.

In another representation, a method comprises: controlling a rotational position of a first barrel cam of a shift assembly of a transmission around a rotational axis via a first motor; controlling a rotational position of a second barrel cam of the shift assembly around the rotational axis via a second motor, independent of the rotational position of the first barrel cam; and adjusting a shift timing of the transmission via the first barrel cam and the second barrel cam responsive to an oil temperature of the transmission. In a first example of the method, adjusting the shift timing based on the oil temperature includes adjusting a relative rotation timing of the first barrel cam and the second barrel cam based on the oil temperature. A second example of the method optionally includes the first example, and further includes wherein adjusting the shift timing based on the oil temperature includes adjusting the shift timing from a predetermined shift timing. A third example of the method optionally includes one or both of the first and second examples, and further includes wherein adjusting the relative rotation timing of the first barrel cam and the second barrel cam includes reducing a duration between disengagement of a second gear of the transmission and engagement of a third gear of the transmission. A fourth example of the method optionally includes one or more or each of the first through third examples, and further includes wherein reducing the duration between disengagement of the second gear of the transmission and engagement of the third gear of the transmission includes advancing a rotation of the second barrel cam relative to a rotation of the first barrel cam responsive to the oil temperature. A fifth example of the method optionally includes one or more or each of the first through fourth examples, and further includes wherein adjusting the relative rotation timing of the first barrel cam and the second barrel cam includes maintaining a duration between disengagement of a second gear of the transmission and engagement of a third gear of the transmission. A sixth example of the method optionally includes one or more or each of the first through fifth examples, and further includes wherein maintaining the duration between disengagement of the second gear of the transmission and engagement of a third gear of the transmission includes retarding a rotation of the second barrel cam relative to a rotation of the first barrel cam responsive to the oil temperature. A seventh example of the method optionally includes one or more or each of the first through sixth examples, and further includes wherein adjusting the relative rotation timing includes controlling a rotation speed of the first barrel cam and a rotation speed of the second barrel cam based on the oil temperature. An eighth example of the method optionally includes one or more or each of the first through seventh examples, and further includes wherein controlling the rotation speed of the first barrel cam includes controlling an energization of a first motor configured to drive the first barrel cam, and controlling the rotation speed of the second barrel cam includes controlling an energization of a second motor configured to drive the second barrel cam. A ninth example of the method optionally includes one or more or each of the first through eighth examples, and further includes wherein controlling the energization of the first motor includes adjusting a duty cycle of the first motor, controlling the energization of the second motor includes adjusting a duty cycle of the second motor. A tenth example of the method optionally includes one or more or each of the first through ninth examples, and further includes wherein an amount of adjustment of the duty cycle of the first motor is different than an amount of adjustment of the duty cycle of the second motor. An eleventh example of the method optionally includes one or more or each of the first through tenth examples, and further includes adjusting the shift timing of the transmission via a learning module stored in a memory of an electronic controller of the transmission. A twelfth example of the method optionally includes one or more or each of the first through eleventh examples, and further includes adjusting the shift timing includes adjusting a rotation timing of the first barrel cam and adjusting a rotation timing of the second barrel cam independently of each other based on a predicted response rate of the first barrel cam and a predicted response rate of the second barrel cam determined by the electronic controller via the learning module. A thirteenth example of the method optionally includes one or more or each of the first through twelfth examples, and further includes wherein an input of the learning module is the oil temperature, and an output of the learning module is the predicted response rate of the first barrel cam and the predicted response rate of the second barrel cam. A fourteenth example of the method optionally includes one or more or each of the first through thirteenth examples, and further includes adjusting the rotation timing of the first barrel cam includes adjusting an energization of a first motor configured to drive the first barrel cam based on the predicted response rate of the first barrel cam, and adjusting the rotation timing of the second barrel cam includes adjusting an energization of a second motor configured to drive the second barrel cam based on the predicted response rate of the second barrel cam.

In another representation, a method comprises: adjusting a shift timing of a transmission of a vehicle by controlling a rotation timing of a first barrel cam of a shift assembly of the transmission around a rotational axis via a first motor, controlling a rotation timing of a second barrel cam of the shift assembly around the rotational axis via a second motor, independent of the rotation timing of the first barrel cam, and adjusting the rotation timing of the first barrel cam and the rotation timing of the second barrel cam based on a speed of the vehicle and a commanded torque output of the vehicle. In a first example of the method, the method further comprises, responsive to a first condition, controlling the rotation timing of the first barrel cam to rotate only the first barrel cam, in a first direction, to engage a first gear in a gear sequence of the transmission. A second example of the method optionally includes the first example, and further includes wherein the first condition includes transitioning the vehicle from a neutral mode to a drive mode. A third example of the method optionally includes one or both of the first and second examples, and further includes, responsive to a second condition, controlling the rotation timing of the first barrel cam to rotate only the first barrel cam, in the first direction, to engage a second gear in the gear sequence of the transmission. A fourth example of the method optionally includes one or more or each of the first through third examples, and further includes wherein the second condition includes transitioning the speed of the vehicle above a second threshold speed. A fifth example of the method optionally includes one or more or each of the first through fourth examples, and further includes, responsive to a third condition, controlling the rotation timing of the first barrel cam to rotate the first barrel cam in the first direction to disengage the second gear, while controlling the rotation timing of the second barrel cam to concurrently rotate the second barrel cam in the first direction to initiate engagement of a third gear in the gear sequence of the transmission. A sixth example of the method optionally includes one or more or each of the first through fifth examples, and further includes wherein the third condition includes transitioning the speed of the vehicle above a third threshold speed. A seventh example of the method optionally includes one or more or each of the first through sixth examples, and further includes where the third threshold speed is greater than the second threshold speed, and the second threshold speed is greater than the first threshold speed. An eighth example of the method optionally includes one or more or each of the first through seventh examples, and further includes, responsive to a park condition, controlling the rotation timing of the first barrel cam to rotate the first barrel cam to engage a first gear in a gear sequence of the transmission, while concurrently controlling the rotation timing of the second barrel cam to rotate the second barrel cam to engage a third gear in the gear sequence of the transmission.

In another representation, a system comprises: a transmission; a first barrel cam; a second barrel cam arranged coaxially with the first barrel cam; a first motor configured to drive the first barrel cam via a first gear assembly; a second motor configured to drive the second barrel cam independent of the first barrel cam via a second gear assembly, where the second gear assembly is arranged coaxially with the first gear assembly; an oil temperature sensor; and a controller with computer readable instructions stored on non-transitory memory that when executed, cause the controller to: adjust a shift timing of the transmission via the first barrel cam and the second barrel cam responsive to an oil temperature of the transmission output by the oil temperature sensor. In a first example of the system, the first barrel cam and second barrel cam are coupled via a protrusion of the second barrel cam arranged within a recess of the first barrel cam, with the protrusion and recess each arranged along a rotational axis of the first barrel cam and second barrel cam, and where the first barrel cam and the second barrel cam are rotatable independently of each other. A second example of the system optionally includes the first example, and further includes wherein the first barrel cam includes a first plurality of detents arranged along an outer perimeter of the first barrel cam at a side of the first barrel cam opposite to the recess, and the second barrel cam includes a second plurality of detents arranged along an outer perimeter of the second barrel cam at a side of the second barrel cam opposite to the protrusion. A third example of the system optionally includes one or both of the first and second examples, and further includes wherein the controller further includes instructions stored on the non-transitory memory that when executed, cause the controller to: adjust a rotation timing of the first barrel cam and adjust a rotation timing of the second barrel cam independently of each other based on a predicted response rate of the first barrel cam and a predicted response rate of the second barrel cam determined by the controller based on the oil temperature. A fourth example of the system optionally includes one or more or each of the first through third examples, and further includes a first shift fork including a first following pin seated within a first cam track of the first barrel cam, and a second shift fork including a second following pin seated within a second cam track of the second barrel cam, where the first shift fork is configured to slide along a first axis parallel to the rotational axis of the first barrel cam and the second barrel cam responsive to a rotation of the first barrel cam, and the second shift fork is configured to slide along the first axis responsive to a rotation of the second barrel cam. A fifth example of the system optionally includes one or more or each of the first through fourth examples, and further includes a vehicle speed sensor; and instructions stored on the non-transitory memory of the controller that when executed, cause the controller to: adjust a gear engagement of the transmission by controlling a rotational position of the first barrel cam and the second barrel cam. A sixth example of the system optionally includes one or more or each of the first through fifth examples, and further includes a power source electrically coupled to the first motor and second motor; and instructions stored on the non-transitory memory of the controller that when executed, cause the controller to: control the rotational position of the first barrel cam by adjusting a first amount of electrical power and a first polarity of the electrical power provided to the first motor by the power source; and control the rotational position of the second barrel cam by adjusting a second amount of electrical power and a second polarity of the electrical power provided to the second motor by the power source.

In another representation, a method comprises: controlling a shift timing of a transmission of a vehicle by controlling a rotation timing of a first barrel cam of a shift assembly of the transmission around a rotational axis via a first motor and controlling a rotation timing of a second barrel cam of the shift assembly around the rotational axis via a second motor, independent of the rotation timing of the first barrel cam, where the rotation timing of the first barrel cam and the rotation timing of the second barrel cam are each based on a speed of the vehicle and a commanded torque output of the vehicle. In a first example of the method, the method further comprises: adjusting the shift timing by adjusting only the rotation timing of the first barrel cam; and responsive to a condition, transitioning the transmission directly between engagement of a first gear of a gear sequence of the transmission and engagement of a second gear of the gear sequence with the adjusted shift timing. A second example of the method optionally includes the first example, and further includes wherein the condition comprises the speed of the vehicle transitioning above or below a threshold vehicle speed. A third example of the method optionally includes one or both of the first and second examples, and further includes wherein the condition comprises the commanded torque output of the vehicle transitioning above or below a threshold commanded torque output. A fourth example of the method optionally includes one or more or each of the first through third examples, and further includes wherein adjusting the shift timing by adjusting only the rotation timing of the first barrel cam includes advancing or retarding the rotation timing of only the first barrel cam. A fifth example of the method optionally includes one or more or each of the first through fourth examples, and further includes: adjusting the shift timing by concurrently adjusting each of the rotation timing of the first barrel cam and the rotation timing of the second barrel cam; and responsive to a condition, transitioning the transmission directly between engagement of a first gear or a second gear of a gear sequence of the transmission and engagement of a third gear of the gear sequence with the adjusted shift timing. A sixth example of the method optionally includes one or more or each of the first through fifth examples, and further includes wherein the condition comprises the commanded torque output of the vehicle transitioning above or below a threshold commanded torque output. A seventh example of the method optionally includes one or more or each of the first through sixth examples, and further includes wherein the condition comprises a rate of change of the commanded torque output exceeding a threshold rate of change. An eighth example of the method optionally includes one or more or each of the first through seventh examples, and further includes wherein the condition comprises a rate of change of the vehicle speed exceeding a threshold rate of change. A ninth example of the method optionally includes one or more or each of the first through eighth examples, and further includes wherein adjusting the shift timing by adjusting each of the rotation timing of the first barrel cam and the rotation timing of the second barrel cam includes advancing each of the rotation timing of the first barrel cam and the rotation timing of the second barrel cam or retarding each of the rotation timing of the first barrel cam and the rotation timing of the second barrel cam.

It will be appreciated that the configurations and routines disclosed herein are exemplary in nature, and that these specific embodiments are not to be considered in a limiting sense, because numerous variations are possible. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a transmission;
   a first barrel cam;
   a second barrel cam arranged coaxially with the first barrel cam;
   a first motor configured to drive the first barrel cam via a first gear assembly;
   a second motor configured to drive the second barrel cam independent of the first barrel cam via a second gear assembly, wherein the second gear assembly is arranged coaxially with the first gear assembly;
   an oil temperature sensor; and
   a controller with a first set of computer readable instructions stored on non-transitory memory that when executed by a micro-processor unit, cause the controller to:
     in response to an oil temperature measured by the oil temperature sensor falling below a first threshold value, advance a timing of the first barrel cam while retarding a timing of the second barrel cam.

2. The system of claim 1, wherein the first barrel cam and the second barrel cam are coupled via a protrusion that is arranged on an axial side of the second barrel cam arranged within a recess that is arranged on an axial side of the first barrel cam, with the protrusion and the recess each arranged along a rotational axis of the first barrel cam and the second barrel cam, and wherein the first barrel cam and the second barrel cam are rotatable independently of each other.

3. The system of claim 2, further comprising a first shift fork including a first following pin seated within a first cam track of the first barrel cam, and a second shift fork including a second following pin seated within a second cam track of the second barrel cam, wherein the first shift fork is configured to slide along a first axis parallel to the rotational axis of the first barrel cam and the second barrel cam responsive to a rotation of the first barrel cam, and the second shift fork is configured to slide along the first axis responsive to a rotation of the second barrel cam.

4. The system of claim 2, wherein the first barrel cam includes a first plurality of detents arranged along an outer perimeter of the first barrel cam at a side of the first barrel cam opposite to the recess, and the second barrel cam includes a second plurality of detents arranged along an outer perimeter of the second barrel cam at a side of the second barrel cam opposite to the protrusion.

5. The system of claim 1, wherein the controller further includes a second set of computer readable instructions stored on the non-transitory memory that when executed by the micro-processor unit, cause the controller to:
- in response to an oil temperature measured by the oil temperature sensor increasing above a second threshold value, advance a timing of the second barrel while retarding a timing of the first barrel cam.

6. The system of claim 1, further comprising a vehicle speed sensor; and
- a second set of computer readable instructions stored on the non-transitory memory of the controller that, when executed by the micro-processor unit, cause the controller to adjust a gear engagement of the transmission by controlling a rotational position of the first barrel cam and the second barrel cam.

7. The system of claim 6, further comprising a power source electrically coupled to the first motor and the second motor; and
- a third set of computer readable instructions stored on the non-transitory memory of the controller that, when executed by the micro-processor unit, cause the controller to:
  - control the rotational position of the first barrel cam by adjusting a first amount of electrical power and a first polarity of the electrical power provided to the first motor by the power source; and
  - control the rotational position of the second barrel cam by adjusting a second amount of electrical power and a second polarity of the electrical power provided to the second motor by the power source.

* * * * *